(12) United States Patent
Tanaka et al.

(10) Patent No.: US 7,801,008 B2
(45) Date of Patent: Sep. 21, 2010

(54) DIFFRACTIVE OPTICAL ELEMENT, OBJECTIVE OPTICAL SYSTEM INCLUDING THE SAME, AND OPTICAL PICKUP INCLUDING THE SAME

(75) Inventors: Yasuhiro Tanaka, Hyogo (JP);
Michihiro Yamagata, Osaka (JP);
Katsuhiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 632 days.

(21) Appl. No.: 11/797,209

(22) Filed: May 1, 2007

(65) Prior Publication Data
US 2007/0258145 A1 Nov. 8, 2007

Related U.S. Application Data

(60) Provisional application No. 60/878,675, filed on Jan. 5, 2007.

(30) Foreign Application Priority Data
May 1, 2006 (JP) .............................. 2006-127367

(51) Int. Cl.
*G11B 7/00* (2006.01)

(52) U.S. Cl. ............................. 369/112.03; 369/112.01; 369/112.04; 369/112.06; 369/112.07; 359/565; 359/569; 359/573; 359/576

(58) Field of Classification Search ............ 369/112.01, 369/112.03, 112.04, 112.06, 112.17; 359/565, 359/576, 569, 573
See application file for complete search history.

(56) References Cited

U.S. PATENT DOCUMENTS

| 7,227,704 | B2 * | 6/2007 | Koike .......................... 359/719 |
| 7,443,779 | B2 * | 10/2008 | Kitahara et al. .......... 369/112.1 |
| 7,502,299 | B2 * | 3/2009 | Ori et al. ............... 369/112.04 |
| 2005/0259554 | A1 * | 11/2005 | Katsuma et al. ........ 369/112.23 |
| 2006/0077795 | A1 * | 4/2006 | Kitahara et al. ........ 369/44.24 |

FOREIGN PATENT DOCUMENTS

| JP | 9-127321 | 5/1997 |
| JP | 2003-207714 | 7/2003 |
| JP | 2004-138895 | 5/2004 |
| JP | 2005-100586 | 4/2005 |
| JP | 2005-190620 | 7/2005 |
| JP | 2006-12371 | 1/2006 |

* cited by examiner

*Primary Examiner*—Wayne R Young
*Assistant Examiner*—Brenda Bernardi
(74) *Attorney, Agent, or Firm*—McDermott Will & Emery LLP

(57) ABSTRACT

A diffractive optical element includes a first optical part and a second optical part bonded to each other with a bonded surface therebetween configured as a diffraction surface. In this diffractive optical element, the diffraction order of diffracted light with the largest quantity of light out of diffracted light for one of a plurality of kinds of laser beams obtained on the diffraction surface is different from the diffraction order for at least another laser beam.

13 Claims, 14 Drawing Sheets

FIG.. 35

DIFFRACTIVE OPTICAL ELEMENT, OBJECTIVE OPTICAL SYSTEM INCLUDING THE SAME, AND OPTICAL PICKUP INCLUDING THE SAME

CROSS-REFERENCE TO RELATED APPLICATIONS

This application claims priority under 35 U.S.C. §119 on Patent Application No. 2006-127367 filed in Japan on May 1, 2006, the entire contents of which are hereby incorporated by reference.

Also, this application claims the benefit of U.S. Provisional Application No. 60/878,675 filed on Jan. 5, 2007.

BACKGROUND OF THE INVENTION

The present invention relates to a diffractive optical element, an objective optical system including the same and an optical pickup including the same.

According to, for example, Patent Document 1 (Japanese Laid-Open Patent Publication No. 9-127321), in a diffractive optical element including a plurality of stacked optical parts (optical materials) and a relief pattern formed on at least one of boundary surfaces, the wavelength dependency of the diffraction efficiency attained on the boundary surface having the relief pattern is lowered by employing an architecture satisfying the following formulas:

$$n_1(\lambda) > n_2(\lambda)$$

$$[\{n_1(\lambda_2)-n_2(\lambda_2)\}/\{n_1(\lambda_1)-n_2(\lambda_1)\}] > [\{n_1(\lambda_2)-1\}/\{n_1(\lambda_1)-1\}] \quad (*)$$

wherein $\lambda_1$ and $\lambda_2$ are arbitrary wavelengths and $\lambda_1 < \lambda_2$, $n_1(\lambda)$ is a refractive index to light of a wavelength $\lambda$ of one optical part facing the boundary surface, and $n_2(\lambda)$ is a refractive index to the light of the wavelength $\lambda$ of the other optical part facing the boundary surface.

SUMMARY OF THE INVENTION

In the technique disclosed in Patent Document 1, however, since it is necessary to satisfy the conditional formula (*), materials usable for the optical parts are limited, and hence, the degree of design freedom of the diffractive optical element is disadvantageously lowered.

The present invention was devised in consideration of this disadvantage and an object of the invention is providing a diffractive optical element having diffraction efficiency with low wavelength dependency and a high degree of design freedom.

In order to achieve the object, the diffractive optical element of this invention includes a first optical part and a second optical part bonded to each other with a bonded surface therebetween formed as a diffraction surface for diffracting a plurality of kinds of laser beams of different wavelengths on the diffraction surface, and diffracted light with the largest quantity of light out of diffracted light for at least one of the plurality of kinds of laser beams obtained on the diffraction surface has a second or higher diffraction order.

The objective optical system of this invention is used for focusing each of a plurality of kinds of laser beams of different wavelengths on an information recording surface of an optical information recording medium and includes at least a diffractive optical element including a first optical part and a second optical part bonded to each other with a bonded surface therebetween formed as a diffraction surface for diffracting the plurality of kinds of laser beams on the diffraction surface, and diffracted light with the largest quantity of light out of diffracted light for at least one of the plurality of kinds of laser beams obtained on the diffraction surface of the diffractive optical element has a second or higher diffraction order.

The optical pickup of this invention is used for focusing a laser beam on an information recording surface of an optical information recording medium and includes a light source for emitting a plurality of kinds of laser beams of different wavelengths; and an objective optical system for focusing each of the plurality of kinds of laser beams emitted from the light source onto the information recording surface, and the objective optical system contains at least a diffractive optical element including a first optical part and a second optical part bonded to each other with a bonded surface therebetween formed as a diffraction surface for diffracting each of the plurality of kinds of laser beams emitted from the light source on the diffraction surface, and diffracted light with the largest quantity of light out of diffracted light for at least one of the plurality of kinds of laser beams obtained on the diffraction surface of the diffractive optical element has a second or higher diffraction order.

According to the present invention, a diffractive optical element having diffraction efficiency with low wavelength dependency and a high degree of design freedom can be realized.

BRIEF DESCRIPTION OF THE DRAWINGS

FIG. 35 is a diagram of aberration caused when light of a wavelength of 780 nm enters the diffractive optical element 2 in Numerical Example 12

DETAILED DESCRIPTION OF THE INVENTION

Preferred embodiments of the invention will now be described in detail with reference to the accompanying drawings.

Embodiment 1

Figure 1:
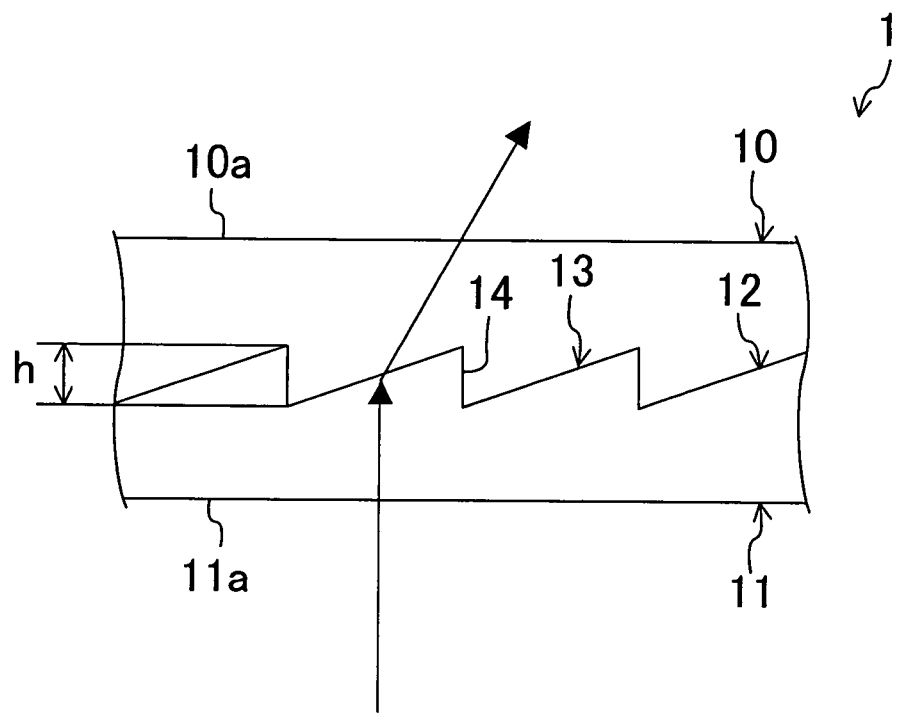
FIG. 1 is a schematic cross-sectional view of a diffractive optical element 1 according to Embodiment 1 of the invention.

FIG. 1 is a schematic cross-sectional view of a diffractive optical element 1 according to Embodiment 1.

The diffractive optical element 1 of this embodiment diffracts a plurality of kinds of laser beams of different wavelengths (preferably of mutually discrete wavelengths). The diffractive optical element 1 includes a first optical part 10 and a second optical part 11 respectively made of optically transparent glass, resin or the like. The first optical part 10 and the second optical part 11 are bonded to each other, and a bonded surface 12 therebetween is configured as a diffraction surface 13 formed of a plurality of regularly arranged structural units, each being a concave and/or a convex (specifically, a diffraction surface having a saw-tooth-shaped cross-section in which a plurality of fine convexes 14 each having a substantially triangular cross-section (whose top may be chamfered or R-chamfered or whose sides may be curved) are regularly arranged). On the other hand, a surface 10a of the first optical part 10 opposite to the bonded surface 12 and a surface 11a of the second optical part 11 opposite to the bonded surface 12 are formed in the shape of parallel planes, and as shown in FIG. 1, a laser beam entering the diffractive optical element 1 from the side of the second optical part 11 is diffracted on the diffraction surface 13 and goes out from the side of the first optical part 10. At this point, since the optical power of the diffraction surface 13 has wavelength dependency, the diffraction surface 13 provides a plurality of kinds of laser beams of different wavelengths respectively with different phases so as to diffract the plural kinds of laser beams respectively at different angles of diffraction. Therefore, the diffractive optical element 1 can be used as, for example, a phase correcting element in an optical device such as an optical pickup using a plurality of kinds of leaser beams of different wavelengths.

In the diffractive optical element 1, a diffraction order of diffracted light with the largest quantity of light out of diffracted light for at least one of the plural kinds of laser beams obtained on the diffraction surface 13 is second or higher order. Furthermore, the diffraction order for all the laser beams may be second or higher order. Alternatively, in the diffractive optical element 1, the diffraction order of one diffracted light with the largest quantity of light out of diffracted light for one of the plural kinds of laser beams obtained on the diffraction surface 13 may be different from the diffraction order for at least another laser beam.

For example, in the case where a diffraction order for a plurality of kinds of laser beams of different wavelengths is limited to a first-order, the aforementioned conditional formula (*) is preferably satisfied for attaining high diffraction efficiency in all the kinds of laser beams, and thus, the degree of design freedom of the diffractive optical element is lowered.

On the contrary, according to the architecture of Embodiment 1, conditions (such as conditions of refractive indexes and dispersion) required of the first optical part 10 and the second optical part 11 for attaining high diffraction efficiency in the plural kinds of laser beams can be comparatively eased. In other words, according to the architecture of Embodiment 1, the diffractive optical element 1 can attain diffraction efficiency with low wavelength dependency, high diffraction efficiency in all of the plural kinds of laser beams and a high degree of design freedom. Furthermore, when diffracted light with the largest quantity of light out of diffracted light for at least one of the plural kinds of laser beams obtained on the diffraction surface 13 has a second or higher diffraction order, the pitch (i.e., a distance between tops of adjacent convexes 14) of the diffraction surface 13 can be increased, and hence, the diffractive optical element 1 can be fabricated more easily. For easing the fabrication of the diffractive optical element 1, the diffraction order of the diffracted light with the largest quantity of light out of diffracted light for all the kinds of laser beams obtained on the diffraction surface 13 is more preferably a second or higher order.

Furthermore, in the case where the diffractive optical element 1 diffracts, for example, an ith (wherein i=1, 2, 3, . . . , k–2, k–1 or k) laser beam of a wavelength $\lambda_i$ (wherein i=1, 2, 3, . . . , k–2, k–1 or k) out of k kinds of laser beams, the following conditional formula (2) is preferably satisfied in a region of the diffractive optical element 1 where at least two of the first through kth laser beams enter:

$$0.83 < (m_i \cdot \lambda_i / |n_1(\lambda_i) - n_2(\lambda_i)|)/h < 1.17 \quad \text{Formula (2)}$$

wherein $m_i$ is the diffraction order of diffracted light with the largest quantity of light out of diffracted light for the ith laser beam obtained on the diffraction surface 13; $\lambda_i$ is the wavelength of the ith laser beam; $n_1(\lambda_i)$ is the refractive index of the first optical part 10 to the ith laser beam; $n_2(\lambda_i)$ is the refractive index of the second optical part 11 to the ith laser beam; and h is the height of the structural unit (i.e., the convex 14) along the optical axis (see FIG. 1).

In this architecture, high diffraction efficiency can be attained in all the ith (wherein i=1, 2, 3, . . . , k–2, k–1 and k) laser beams. On the other hand, in a range lower than or higher than the range of this conditional formula, the diffraction efficiency of the ith laser beam attained on the bonded surface 12 tends to be lowered and is, for example, 90% or less.

In order to attain higher diffraction efficiency, the following conditional formula (2-1) is more preferably satisfied:

$$0.875 < (m_i \cdot \lambda_i / |n_1(\lambda_i) - n_2(\lambda_i)|)/h < 1.125 \quad \text{Formula (2)}$$

wherein $m_i$ is the diffraction order of diffracted light with the largest quantity of light out of diffracted light for the ith laser beam obtained on the diffraction surface 13; $\lambda_i$ is the wavelength of the ith laser beam; $n_1(\lambda_i)$ is the refractive index of the first optical part 10 to the ith laser beam; $n_2(\lambda_i)$ is the refractive index of the second optical part 11 to the ith laser beam; and h is the height of the structural unit (i.e., the convex 14) along the optical axis.

In this architecture, higher diffraction efficiency of 95% or more can be attained in all the ith (wherein i=1, 2, 3, . . . , k–2, k–1 and k) laser beams.

The conditional formula (2) or (2-1) is satisfied preferably for all of the first through kth laser beams. However, in the case where there is no need to attain such high diffraction efficiency for some of the laser beams, the conditional formula (2) or (2-1) need not be always satisfied for all of these laser beams. For example, the conditional formula (2-1) may be satisfied for the first and second laser beams required of particularly high diffraction efficiency with not the conditional formula (2-1) but the conditional formula (2) satisfied for the third laser beam and with the conditional formula (2) not satisfied for the fourth through kth laser beams.

More specifically, in the case where the diffractive optical element 1 diffracts a first laser beam of a first wavelength $\lambda_1$, a second laser beam of a second wavelength $\lambda_2$ different from the first wavelength $\lambda_1$, and a third laser beam of a third wavelength $\lambda_3$ different from the first wavelength $\lambda_1$ and the second wavelength $\lambda_2$, it is more preferable that the following conditional formulas (3) through (5) are satisfied in a region where at least two of the first through third laser beams enter:

$$0.83 < (m_1 \cdot \lambda_1 / |n_1(\lambda_1) - n_2(\lambda_1)|)/h < 1.17 \quad \text{Formula (3)}$$

$$0.83 < (m_2 \cdot \lambda_2 / |n_1(\lambda_2) - n_2(\lambda_2)|)/h < 1.17 \quad \text{Formula (4)}$$

$$0.83 < (m_3 \cdot \lambda_3 / |n_1(\lambda_3) - n_2(\lambda_3)|)/h < 1.17 \quad \text{Formula (5)}$$

wherein $m_1$ is the diffraction order of diffracted light with the largest quantity of light out of diffracted light for the first laser beam obtained on the diffraction surface 13; $m_2$ is the diffraction order of diffracted light with the largest quantity of light out of diffracted light for the second laser beam obtained on the diffraction surface 13; $m_3$ is the diffraction order of diffracted light with the largest quantity of light out of diffracted light for the third laser beam obtained on the diffraction surface 13; $\lambda_1$ is the wavelength of the first laser beam (i.e., the first wavelength); $\lambda_2$ is the wavelength of the second laser beam (i.e., the second wavelength); $\lambda_3$ is the wavelength of the third laser beam (i.e., the third wavelength); $n_1(\lambda_1)$ is the refractive index of the first optical part 10 to the first laser beam; $n_1(\lambda_2)$ is the refractive index of the first optical part 10 to the second laser beam; $n_1(\lambda_3)$ is the refractive index of the first optical part 10 to the third laser beam; $n_2(\lambda_1)$ is the refractive index of the second optical part 11 to the first laser beam; $n_2(\lambda_2)$ is the refractive index of the second optical part 11 to the second laser beam; $n_2(\lambda_3)$ is the refractive index of the second optical part 11 to the third laser beam; and h is the height of the structural unit (i.e., the convex 14) along the optical axis.

In order to attain higher diffraction efficiency, the following conditional formulas (3-1) through (5-1) are more preferably satisfied:

$$0.875 < (m_1 \cdot \lambda_1 / |n_1(\lambda_1) - n_2(\lambda_1)|)/h < 1.125 \quad \text{Formula (3-1)}$$

$$0.875 < (m_2 \cdot \lambda_2 / |n_1(\lambda_2) - n_2(\lambda_2)|)/h < 1.125 \quad \text{Formula (4-1)}$$

$$0.875 < (m_3 \cdot \lambda_3 / |n_1(\lambda_3) - n_2(\lambda_3)|)/h < 1.125 \quad \text{Formula (5-1)}$$

wherein $m_1$ is the diffraction order of diffracted light with the largest quantity of light out of diffracted light for the first laser beam obtained on the diffraction surface 13; $m_2$ is the diffraction order of diffracted light with the largest quantity of light out of diffracted light for the second laser beam obtained on the diffraction surface 13; $m_3$ is the diffraction order of diffracted light with the largest quantity of light out of diffracted light for the third laser beam obtained on the diffraction surface 13; $\lambda_1$ is the wavelength of the first laser beam (i.e., the first wavelength); $\lambda_2$ is the wavelength of the second laser beam (i.e., the second wavelength); $\lambda_3$ is the wavelength of the third laser beam (i.e., the third wavelength); $n_1(\lambda_1)$ is the refractive index of the first optical part 10 to the first laser beam; $n_1(\lambda_2)$ is the refractive index of the first optical part 10 to the second laser beam; $n_1(\lambda_3)$ is the refractive index of the first optical part 10 to the third laser beam; $n_2(\lambda_1)$ is the refractive index of the second optical part 11 to the first laser beam; $n_2(\lambda_2)$ is the refractive index of the second optical part 11 to the second laser beam; $n_2(\lambda_3)$ is the refractive index of the second optical part 11 to the third laser beam; and h is the height of the structural unit (i.e., the convex 14) along the optical axis.

In particular, in the case where the diffractive optical element 1 diffracts a first laser beam of a first wavelength $\lambda_1$ and a second laser beam of a second wavelength $\lambda_2$ different from the first wavelength $\lambda_1$, the preferable condition to be satisfied by the diffractive optical element 1 is further eased. When a conditional formula (1) described below is satisfied, high diffraction efficiency of 90% or more can be attained in all the first and second laser beams. On the other hand, in a range lower than the range of the conditional formula (1), the diffraction efficiency tends to be lowered from 90%. Similarly, in a range higher than the range of the conditional formula (1), the diffraction efficiency tends to be lowered from 90%.

$$0.7 < (m_1 \cdot \lambda_1 (n_1(\lambda_2) - n_2(\lambda_2))) / (m_2 \lambda_2 (n_1(\lambda_1) - n_2(\lambda_1))) < 1.3 \quad \text{Formula (1)}$$

wherein $m_1$ is the diffraction order of diffracted light with the largest quantity of light out of diffracted light for the first laser beam obtained on the diffraction surface 13; $m_2$ is the diffraction order of diffracted light with the largest quantity of light out of diffracted light for the second laser beam obtained on the diffraction surface 13; $\lambda_1$ is the wavelength of the first laser beam; $\lambda_2$ is the wavelength of the second laser beam; $n_1(\lambda_1)$ is the refractive index of the first optical part 10 to the first laser beam; $n_1(\lambda_2)$ is the refractive index of the first optical part 10 to the second laser beam; $n_2(\lambda_1)$ is the refractive index of the second optical part 11 to the first laser beam; and $n_2(\lambda_2)$ is the refractive index of the second optical part 11 to the second laser beam.

Furthermore, a conditional formula (1-1) described below is more preferably satisfied. In this architecture, higher diffraction efficiency of 95% or more can be attained in all the first and second laser beams.

$$0.78 < (m_1 \cdot \lambda_1 (n_1(\lambda_2) - n_2(\lambda_2))) / (m_2 \lambda_2 (n_1(\lambda_1) - n_2(\lambda_1))) < 1.22 \quad \text{Formula (1-1)}$$

wherein $m_1$ is the diffraction order of diffracted light with the largest quantity of light out of diffracted light for the first laser beam obtained on the diffraction surface 13; $m_2$ is the diffraction order of diffracted light with the largest quantity of light out of diffracted light for the second laser beam obtained on the diffraction surface 13; $\lambda_1$ is the wavelength of the first laser beam (i.e., the first wavelength); $\lambda_2$ is the wavelength of the second laser beam (i.e., the second wavelength); $n_1(\lambda_1)$ is the refractive index of the first optical part 10 to the first laser beam; $n_1(\lambda_2)$ is the refractive index of the first optical part 10 to the second laser beam; $n_2(\lambda_1)$ is the refractive index of the second optical part 11 to the first laser beam; and $n_2(\lambda_2)$ is the refractive index of the second optical part 11 to the second laser beam.

Although the first optical part 10 and the second optical part 11 are adhesively stacked, another layer such as an air space may be disposed between the first optical part 10 and the second optical part 11.

Furthermore, in the case where the bonded surface 12 on which the diffraction surface 13 is formed is an aspheric surface, a shape obtained in consideration of a phase shift caused by refraction on the aspheric surface may be employed.

Moreover, the diffraction surface 13 may be what is called a binary diffraction surface in accordance with a condition of desired diffraction efficiency.

It is possible to provide means for increasing diffraction efficiency in a particular wavelength by arbitrarily controlling the height of the periodical structure of the diffraction surface 13.

Embodiment 2

In Embodiment 1, one embodiment of the diffractive optical element of the present invention is described by exemplifying the diffractive optical element 1 of the so-called parallel plate type usable as a phase correcting element or the like. The diffractive optical element of this invention is, however, not limited to the embodiment described in Embodiment 1 but may be an optical element in the form of, for example, a lens or a prism. In Embodiment 2, an example of the diffractive optical element in the form of a lens will be described. Specifically, an objective lens used for respectively focusing a plurality of kinds of laser beams on information recording surfaces 26 of optical information recording media 25 like optical discs such as a CD (compact disc), a DVD (digital versatile disc) and a BD (blu-ray disc (registered trademark)) will be exemplified in this embodiment.

Figure 2:
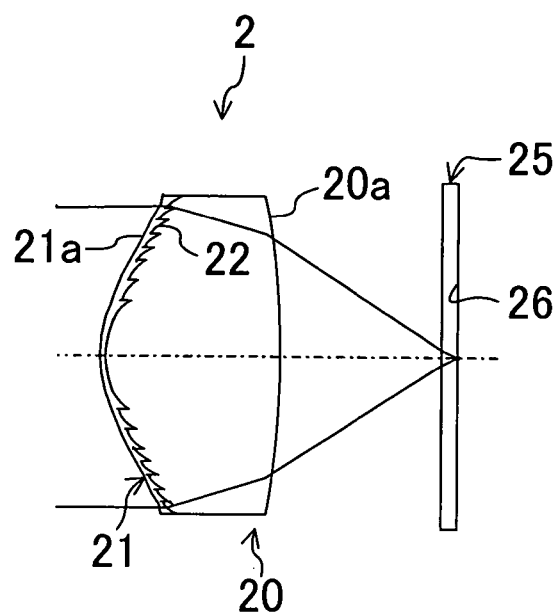
FIG. 2 is a schematic cross-sectional view of a diffractive optical element 2 according to Embodiment 2 of the invention.
Figure 3:
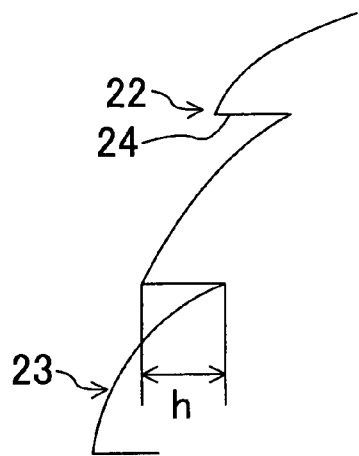
FIG. 3 is a schematic enlarged cross-sectional view of a part of a bonded surface 22 of the diffractive optical element 2.

FIG. 2 is a schematic cross-sectional view of a diffractive optical element 2 according to Embodiment 2. FIG. 3 is a schematic enlarged cross-sectional view of a part of a bonded surface 22 of the diffractive optical element 2.

The diffractive optical element 2 of Embodiment 2 includes a first optical part 20 and a second optical part 21. The first optical part 20 is in the shape of a convex in at least one surface thereof and has positive optical power, and may be, for example, a biconvex lens, a plano-convex lens having one plane surface or a meniscus lens. The one surface of the first optical part 20 in the shape of a convex is configured as a diffraction surface 23 formed of a plurality of regularly arranged structural units, each being a concave and/or a convex (specifically, a diffraction surface having a saw-tooth-shaped cross-section in which a plurality of fine convexes 24 each having a substantially triangular cross-section (whose top may be chamfered or R-chamfered or whose sides may be curved) are regularly arranged). The second optical part 21 is bonded onto this surface. In other words, the bonded surface 22 between the first optical part 20 and the second optical part 21 is formed as the diffraction surface 23.

At this point, since the optical power of the diffraction surface 23 has wavelength dependency, the diffraction surface 23 provides a plurality of kinds of laser beams of different wavelengths respectively with different phases so as to diffract the plural kinds of laser beams respectively at different angles of diffraction. In more detail, the diffraction surface 23 provides a phase in accordance with the kind of laser beam so that a laser beam according to the kind of a loaded optical information recording medium 25 can be properly focused on an information recording surface 26 of the optical information recording medium 25. Specifically, the diffraction surface 23 is formed in the following manner: In the case where, for example, a CD (with a substrate thickness of 1.2 mm and applicable to a laser beam of a wavelength of 780 nm) is loaded as the optical information recording medium 25, a laser beam of a wavelength of 780 nm is shifted in the phase on the diffraction surface 23 so as to be properly focused on the information recording surface 26 of the CD. In the case where a BD (with a substrate thickness of 0.1 mm and applicable to a laser beam of a wavelength of 408 nm) is loaded as the optical information recording medium 25, a laser beam of a wavelength of 408 nm is provided with a phase different from the phase given to the laser beam of the wavelength of 780 nm so as to be properly focused on the information recording surface 26 of the BD. In the case where a DVD (with a substrate thickness of 0.6 mm and applicable to a laser beam of a wavelength of 660 nm) is loaded as the optical information recording medium 25, a laser beam of a wavelength of 660 nm is provided with a phase different from the phase given to the laser beam of the wavelength of 780 nm and the phase given to the laser beam of 408 nm so as to be properly focused on the information recording surface 26 of the DVD.

In the diffractive optical element 2, a diffraction order of diffracted light with the largest quantity of light out of diffracted light for at least one of the plural kinds of laser beams obtained on the diffraction surface 23 is second or higher order in the same manner as in the diffractive optical element 1 of Embodiment 1. Therefore, conditions (such as conditions of refractive indexes and dispersion) required of the first optical part 20 and the second optical part 21 for attaining high diffraction efficiency in the plural kinds of laser beams can be comparatively eased. In other words, according to the architecture of Embodiment 2, the diffractive optical element 2 can attain diffraction efficiency with low wavelength dependency, high diffraction efficiency in all the plural kinds of laser beams and a high degree of design freedom.

The diffraction order for all laser beams may be a second or higher order. Alternatively, the diffraction order may be different or the same among the plural kinds of laser beams. Alternatively, in the diffractive optical element 1, the diffraction order of diffracted light with the largest quantity of light out of diffracted light for one of the plural kinds of laser beams obtained on the diffraction surface 23 may be different from the diffraction order for at least another laser beam.

Furthermore, when diffracted light with the largest quantity of light out of diffracted light for at least one of the plural kinds of laser beams obtained on the diffraction surface 23 has a second or higher diffraction order, the pitch (i.e., a distance between tops of adjacent convexes 14) of the diffraction surface 23 can be increased, and hence, the diffractive optical element 1 can be fabricated more easily. For easing the fabrication of the diffractive optical element 1, the diffraction order of the diffracted light with the largest quantity of light out of diffracted light for all the kinds of laser beams obtained on the diffraction surface 23 is more preferably a second or higher order.

Furthermore, in the case where the diffractive optical element 2 diffracts, for example, an ith (wherein i=1, 2, 3, . . . , k−2, k−1 or k) laser beam of a wavelength $\lambda_i$ (wherein i=1, 2, 3, . . . , k−2, k−1 or k) out of k kinds of laser beams, the following conditional formula (2) is preferably satisfied in a region of the diffractive optical element 2 where at least two of the first through kth laser beams enter:

$$0.83<(m_i\cdot\lambda_i/|n_1(\lambda_i)-n_2(\lambda_i)|)/h<1.17 \quad \text{Formula (2)}$$

wherein $m_i$ is the diffraction order of diffracted light with the largest quantity of light out of diffracted light for the ith laser beam obtained on the diffraction surface 23; $\lambda_i$ is the wavelength of the ith laser beam; $n_1(\lambda_i)$ is the refractive index of the first optical part 20 to the ith laser beam; $n_2(\lambda_i)$ is the refractive index of the second optical part 21 to the ith laser beam; and h is the height of the structural unit (i.e., the convex 24) along the optical axis.

In this architecture, high diffraction efficiency can be attained in all the ith (wherein i=1, 2, 3, . . . , k−2, k−1 and k) laser beams. On the other hand, in a range lower than or higher than the range of this conditional formula, the diffraction efficiency of the ith laser beam attained on the diffraction surface 23 tends to be lowered and is, for example, 90% or less.

In order to attain higher diffraction efficiency, the following conditional formula (2-1) is more preferably satisfied:

$$0.875<(m_i\cdot\lambda_i/|n_1(\lambda_i)-n_2(\lambda_i)|)/h<1.125 \quad \text{Formula (2-1)}$$

wherein $m_i$ is the diffraction order of diffracted light with the largest quantity of light out of diffracted light for the ith laser beam obtained on the diffraction surface 23; $\lambda_i$ is the wavelength of the ith laser beam; $n_1(\lambda_i)$ is the refractive index of the first optical part 20 to the ith laser beam; $n_2(\lambda_i)$ is the refractive index of the second optical part 21 to the ith laser beam; and h is the height of the structural unit (i.e., the convex 24) along the optical axis.

In this architecture, higher diffraction efficiency of 95% or more can be attained in all the ith (wherein i=1, 2, 3, . . . , k−2, k−1 and k) laser beams.

More specifically, in the case where the diffractive optical element 2 diffracts a first laser beam of a first wavelength, a second laser beam of a second wavelength different from the first wavelength, and a third laser beam of a third wavelength different from the first wavelength and the second wavelength, it is more preferable that the following conditional formulas (3) through (5) are satisfied in a region where at least two of the first through third laser beams enter:

$$0.83<(m_1\cdot\lambda_1/|n_1(\lambda_1)-n_2(\lambda_1)|)/h<1.17 \quad \text{Formula (3)}$$

$$0.83<(m_2\cdot\lambda_2/|n_1(\lambda_2)-n_2(\lambda_2)|)/h<1.17 \quad \text{Formula (4)}$$

$$0.83<(m_3\cdot\lambda_3/|n_1(\lambda_3)-n_2(\lambda_3)|)/h<1.17 \quad \text{Formula (5)}$$

wherein $m_1$ is the diffraction order of diffracted light with the largest quantity of light out of diffracted light for the first laser beam obtained on the diffraction surface 23; $m_2$ is the diffraction order of diffracted light with the largest quantity of light out of diffracted light for the second laser beam obtained on the diffraction surface 23; $m_3$ is the diffraction order of diffracted light with the largest quantity of light out of diffracted light for the third laser beam obtained on the diffraction surface 23; $\lambda_1$ is the wavelength of the first laser beam (i.e., the first wavelength); $\lambda_2$ is the wavelength of the second laser beam (i.e., the second wavelength); $\lambda_3$ is the wavelength of the third laser beam (i.e., the third wavelength); $n_1(\lambda_1)$ is the refractive index of the first optical part 20 to the first laser beam; $n_1(\lambda_2)$ is the refractive index of the first optical part 20 to the second laser beam; $n_1(\lambda_3)$ is the refractive index of the first optical part 20 to the third laser beam; $n_2(\lambda_1)$ is the refractive index of the second optical part 21 to the first laser beam; $n_2(\lambda_2)$ is the refractive index of the second optical part 21 to the second laser beam; $n_2(\lambda_3)$ is the refractive index of the second optical part 21 to the third laser beam; and h is the height of the structural unit (i.e., the convex 24) along the optical axis.

In order to attain higher diffraction efficiency, the following conditional formulas (3-1) through (5-1) are more preferably satisfied:

$$0.875<(m_1\cdot\lambda_1/|n_1(\lambda_1)-n_2(\lambda_1)|)/h<1.125 \quad \text{Formula (3-1)}$$

$$0.875<(m_2\cdot\lambda_2/|n_1(\lambda_2)-n_2(\lambda_2)|)/h<1.125 \quad \text{Formula (4-1)}$$

$$0.875<(m_3\cdot\lambda_3/|n_1(\lambda_3)-n_2(\lambda_3)|)/h<1.125 \quad \text{Formula (5-1)}$$

wherein $m_1$ is the diffraction order of diffracted light with the largest quantity of light out of diffracted light for the first laser beam obtained on the diffraction surface 23; $m_2$ is the diffraction order of diffracted light with the largest quantity of light out of diffracted light for the second laser beam obtained on the diffraction surface 23; $m_3$ is the diffraction order of diffracted light with the largest quantity of light out of diffracted light for the third laser beam obtained on the diffraction surface 23; $\lambda_1$ is the wavelength of the first laser beam; $\lambda_2$ is the wavelength of the second laser beam; $\lambda_3$ is the wavelength of the third laser beam; $n_1(\lambda_1)$ is the refractive index of the first optical part 20 to the first laser beam; $n_1(\lambda_2)$ is the refractive index of the first optical part 20 to the second laser beam; $n_1(\lambda_3)$ is the refractive index of the first optical part 20 to the third laser beam; $n_2(\lambda_1)$ is the refractive index of the second optical part 21 to the first laser beam; $n_2(\lambda_2)$ is the refractive index of the second optical part 21 to the second laser beam; $n_2(\lambda_3)$ is the refractive index of the second optical part 21 to the third laser beam; and h is the height of the structural unit (i.e., the convex 24) along the optical axis.

In the case where the diffractive optical element 2 is used for, for example, three kinds of optical information recording media 25 of a CD, a BD and a DVD, the diffractive optical element 2 preferably satisfies the aforementioned conditional formulas (3) through (5) and more preferably satisfies the aforementioned conditional formulas (3-1) through (5-1), in which the wavelength $\lambda_1$ is 780 nm, the wavelength $\lambda_2$ is 408 nm and the wavelength $\lambda_3$ is 660 nm.

In particular, in the case where the diffractive optical element 2 diffracts a first laser beam of a first wavelength and a second laser beam of a second wavelength different from the first wavelength, the preferable condition to be satisfied by the diffractive optical element 2 is further eased. When a conditional formula (1) described below is satisfied, high diffraction efficiency of 90% or more can be attained in all the first and second laser beams. On the other hand, in a range lower than the range of the conditional formula (1), the diffraction efficiency tends to be lowered from 90%. Similarly, in a range higher than the range of the conditional formula (1), the diffraction efficiency tends to be lowered from 90%.

$$0.7 < (m_1 \cdot \lambda_1 (n_1(\lambda_2) - n_2(\lambda_2)))/(m_2 \cdot \lambda_2 (n_1(\lambda_1) - n_2(\lambda_1))) < 1.3 \quad \text{Formula (1)}$$

wherein $m_1$ is the diffraction order of diffracted light with the largest quantity of light out of diffracted light for the first laser beam obtained on the diffraction surface 23; $m_2$ is the diffraction order of diffracted light with the largest quantity of light out of diffracted light for the second laser beam obtained on the diffraction surface 23; $\lambda_1$ is the wavelength of the first laser beam; $\lambda_2$ is the wavelength of the second laser beam; $n_1(\lambda_1)$ is the refractive index of the first optical part 20 to the first laser beam; $n_1(\lambda_2)$ is the refractive index of the first optical part 20 to the second laser beam; $n_2(\lambda_1)$ is the refractive index of the second optical part 21 to the first laser beam; and $n_2(\lambda_2)$ is the refractive index of the second optical part 21 to the second laser beam.

Furthermore, a conditional formula (1-1) described below is more preferably satisfied. In this architecture, higher diffraction efficiency of 95% or more can be attained in all of the first and second laser beams.

$$0.78 < (m_1 \cdot \lambda_1 (n_1(\lambda_2) - n_2(\lambda_2)))/(m_2 \cdot \lambda_2 (n_1(\lambda_1) - n_2(\lambda_1))) < 1.22 \quad \text{Formula (1-1)}$$

wherein $m_1$ is the diffraction order of diffracted light with the largest quantity of light out of diffracted light for the first laser beam obtained on the diffraction surface 23; $m_2$ is the diffraction order of diffracted light with the largest quantity of light out of diffracted light for the second laser beam obtained on the diffraction surface 23; $\lambda_1$ is the wavelength of the first laser beam; $\lambda_2$ is the wavelength of the second laser beam; $n_1(\lambda_1)$ is the refractive index of the first optical part 20 to the first laser beam; $n_1(\lambda_2)$ is the refractive index of the first optical part 20 to the second laser beam; $n_2(\lambda_1)$ is the refractive index of the second optical part 21 to the first laser beam; and $n_2(\lambda_2)$ is the refractive index of the second optical part 21 to the second laser beam.

Embodiment 3

In Embodiment 3, an example of an optical pickup using the diffractive optical element 1 described in Embodiment 1 as a phase correcting element will be described. In the description of Embodiment 3, FIG. 1 is referred to in the same manner as in Embodiment 1. Also, same reference numerals are used to refer to elements having substantially the same functions as in Embodiment 1 so as to omit the description.

Figure 4:
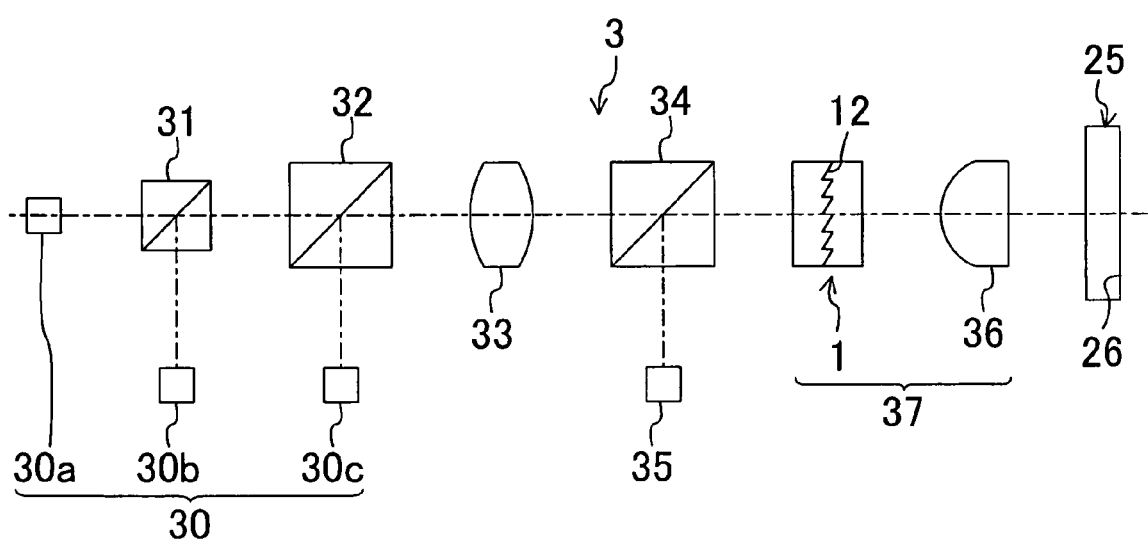
FIG. 4 is a diagram for showing the architecture of a principal part of an optical pickup 3 according to Embodiment 3 of the invention.

FIG. 4 is a diagram for showing the architecture of a principal part of an optical pickup 3 according to Embodiment 3.

The optical pickup 3 includes a multiple wavelength light source 30, beam splitters 31 and 32, a collimator 33, a beam splitter 34, a detector 35 and an objective optical system 37.

The multiple wavelength light source 30 can selectively emit plurality of kinds of laser beams of different wavelengths. Specifically, the multiple wavelength light source 30 emits a laser beam (out of the plural kinds of laser beams) according to the type of optical information recording medium 25 (for example, a laser beam of a wavelength of 750 through 810 nm (such as a laser beam of a wavelength of 780 nm) for a CD, a laser beam of a wavelength of 630 through 690 nm (such as a laser beam of 660 nm) for a DVD and a laser beam of a wavelength of 378 through 438 nm (such as a wavelength of 408 nm) for a BD).

Specifically, the multiple wavelength light source 30 may include a plurality of light sources (laser sources) respectively for emitting the laser beams of the different wavelengths. For example, the multiple wavelength light source 30 may include a light source 30a for emitting a laser beam of a wavelength of 630 through 690 nm, a light source 30b for emitting a laser beam of a wavelength of 378 through 438 nm and a light source 30c for emitting a laser beam of a wavelength of 750 through 810 nm as shown in FIG. 4.

A laser beam emitted by the light source 30a passes through the beams splitters 31 and 32 and is guided toward the objective optical system 37. A laser beam emitted by the light source 30b is bent in its optical path by the reflecting surface of the beam splitter 31, passes through the beam splitter 32 and is guided toward the objective optical system 37. A laser beam emitted by the light source 30c is bent in its optical path by the reflecting surface of the beam splitter 32 and is guided toward the objective optical system 37.

The collimator 33 has a function to change a laser beam emitted by the multiple wavelength light source 30 into a parallel beam (or a given divergent beam if necessary). The collimator 33 may be made of one lens. Alternatively, the collimator 33 may be made of an optical system including two lenses such as a concave lens and a convex lens. Although the collimator 33 is disposed on the side of the beam splitters 31 and 32 closer to the optical information recording medium 25 in this embodiment, for example, a collimator designed for the light source 30c alone may be provided between the beam splitter 32 and the light source 30c with collimators respectively designed for the light sources 30a and 30b alone disposed between the beam splitter 31 and the light sources 30a and 30b respectively.

The laser beam changed into the parallel beam (or the given divergent beam) by the collimator 33 passes through the beam splitter 34 and enters the objective optical system 37. The objective optical system 37 includes a diffractive optical element 1 and an objective lens 36 arranged in this order from the side of the multiple wavelength light source 30. The objective lens 36 is a convex lens having an aspheric surface on at least one lens surface thereof (preferably on both lens surfaces), and is used for focusing a laser beam having passed through the diffractive optical element 1 on an information recording surface 26 of the optical information recording medium 25. Although the objective lens 36 is made of one lens in Embodiment 3, it may include a plurality of lenses.

Since the diffractive optical element 1 includes a first optical part 10 and a second optical part 11 having different optical characteristics (such as a refractive index and dispersion) bonded to each other, it exhibits different wavefront shifting functions depending upon the wavelength of incident light. In Embodiment 3, in order that outgoing light from the diffractive optical element 1 is focused on the information recording surface 26 by the objective lens 36, the wavefront of the laser beam having entered the diffractive optical element 1 is shifted into a different wavefront according to the type of optical information recording medium 25 on which the laser beam is to be focused and the thus shifted beam is emitted. In other words, the diffractive optical element 1 corrects aberration caused when the wavelength of the laser beam or the thickness of a protecting layer of the loaded optical information recording medium 25 (i.e., a distance between the surface of the optical information recording medium 25 facing the light source and the information recording surface 26) is varied.

Specifically, in the case where a BD 25a (having a protecting layer with a thickness of 0.1 mm) is loaded as the optical information recording medium 25, a parallel laser beam of a wavelength of 378 through 438 nm enters the diffractive optical element 1. The diffractive optical element 1 does not shift the wavefront of the laser beam of the wavelength of 378 through 438 nm but transmits the laser beam. Accordingly, the diffractive optical element 1 emits the parallel laser beam. In this case, the objective lens 36 is designed to properly focus the parallel laser beam of the wavelength of 378 through 438 nm on the information recording surface 26 of the BD 25a having the protecting layer with a thickness of 0.1 mm. Therefore, the laser beam of the wavelength of 378 through 438 nm having entered the objective lens 36 is properly focused on the information recording surface 26 by the objective lens 36.

On the other hand, in the case where a DVD 25b is loaded as the optical information recording medium 25, a parallel laser beam of a wavelength of 630 through 690 nm enters the diffractive optical element 1. The diffractive optical element 1 causes spherical aberration so that the laser beam of the wavelength of 630 through 690 nm can be properly focused on the information recording surface 26 of the DVD 25b by the objective lens 36. Accordingly, owing to the wavefront shifting function of the diffractive optical element 1, the laser beam of the wavelength of 630 through 690 nm emitted from the multiple wavelength light source 30 is properly focused on the information recording surface 26 of the DVD 25b.

Alternatively, in the case where a CD 25c is loaded as the optical information recording medium 25, a laser beam of a wavelength of 750 through 810 nm enters the diffractive optical element 1. The diffractive optical element 1 causes spherical aberration so that the laser beam of the wavelength of 750 through 810 nm can be properly focused on the information recording surface 26 of the CD 25c by the objective lens 36. Accordingly, owing to the wavefront shifting function of the diffractive optical element 1, the laser beam of the wavelength of 750 through 810 nm emitted from the light source is properly focused on the information recording surface 26 of the CD 25c.

The laser beam having been focused on the information recording surface 26 of the optical information recording medium 25 by the objective lens 36 is reflected or diffused by the information recording surface 26. The laser beam having been reflected by the information recording surface 26 enters the objective optical system 37 again and is reflected by the reflecting surface of the beam splitter 34 so as to enter the detector 35. The intensity of the reflected light is measured in the detector 35, and information recorded on the information recording surface 26 is detected on the basis of the thus measured intensity.

As described so far, since the diffractive optical element 1 is disposed on the side of the objective lens 36 closer to the multiple wavelength light source 30, the laser beams of the wavelengths respectively corresponding to all the optical information recording media 25 of the BD 25a, the DVD 25b and the CD 25c can be properly focused on the information recording surfaces 26 of these optical information recording media 25.

Furthermore, since the wavelength dependency of the diffraction efficiency of the diffractive optical element 1 is low as described in Embodiment 1, the diffraction efficiency and the utilization efficiency of the laser beam corresponding to each type of optical information recording media 25 can be improved. Furthermore, since the degree of design freedom of the diffractive optical element 1 is high, the degree of design freedom of the optical pickup 3 is improved and the fabrication cost of the optical pickup 3 is lowered.

It is noted that each of the beam splitters 31, 32 and 34 may be replaced with a dichroic mirror or may be used together with a plane mirror. Specifically, optical path synthesizing means may be made of an arbitrary combination of one or plural beam splitters, one or plural dichroic mirrors and one or plural plane mirrors. Moreover, the optical path synthesizing means is not always necessary, for example, when the light sources 30a, 30b and 30c are arranged on one optical path or are movable in accordance with the position of the optical system.

Embodiment 4

In Embodiment 3 described above, the objective optical system 37 is composed of the diffractive optical element 1 used as a phase correcting element and the objective lens 36. The objective optical system 37 may be composed of, for example, merely a diffractive optical element 2 used as an objective lens. In this embodiment, the objective optical system 37 is composed of the diffractive optical element 2 described in Embodiment 2. In the description of this embodiment, FIGS. 2 and 3 are referred to in the same manner as in Embodiment 2. Also, same reference numerals are used to refer to elements having substantially the same functions as in Embodiments 1 through 3 so as to omit the description.

Figure 5:
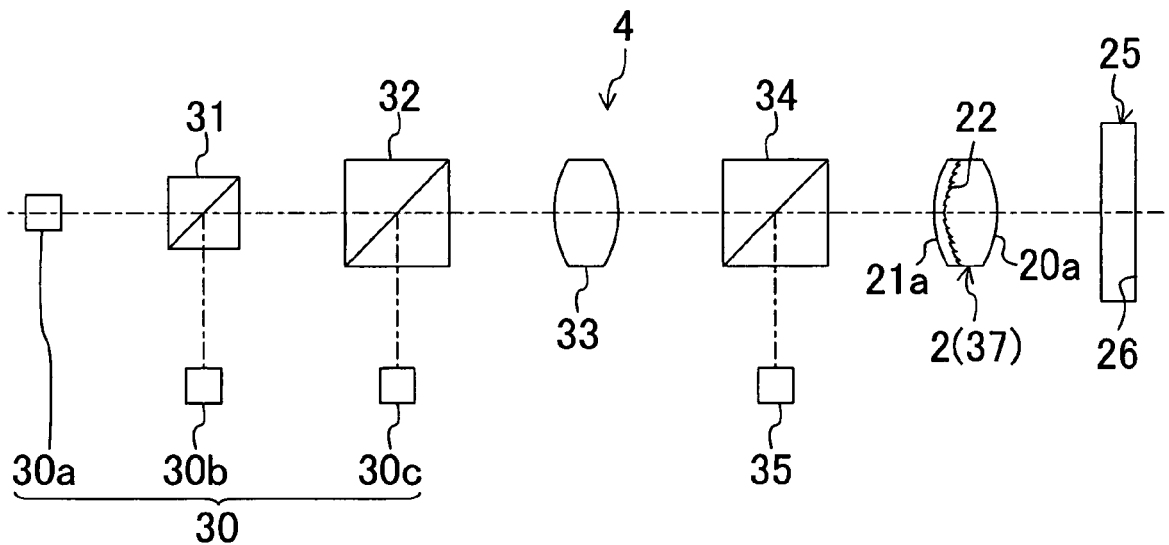
FIG. 5 is a diagram for showing the architecture of a principal part of an optical pickup 4 according to Embodiment 4 of the invention.

FIG. 5 is a diagram for showing the architecture of a principal part of an optical pickup 4 according to Embodiment 4.

In Embodiment 4, the diffractive optical element 2 used as the objective optical system 37 has functions as both the diffractive optical element 1 and the objective lens 36 described in Embodiment 3 above. Specifically, the diffractive optical element 2 exhibits different wavefront shifting functions in accordance with the wavelengths of incident light, and shifts, on the diffraction surface 23, a wavefront of a laser beam to a different wavefront in accordance with the type of optical information recording medium 25 on which the laser beam is to be focused, so that the laser beam can be properly focused on the information recording surface 26 of the optical information recording medium 25 by using refractive power of lens surfaces 20a and 21a. In other words, the diffraction surface 23 corrects aberration of the lens surfaces 20a and 21a caused when, for example, the wavelength of a laser beam entering the diffractive optical element 2 is varied. Accordingly, in the same manner as in Embodiment 3, laser beams of different wavelengths corresponding to all the optical information recording media 25 of the BD 25a, the DVD 25b and the CD 25c can be properly focused on the information recording surfaces 26 of these optical information recording media 25.

Furthermore, since the wavelength dependency of the diffraction efficiency of the diffractive optical element 2 is low as described in Embodiment 2, the diffraction efficiency and the utilization efficiency of the laser beam corresponding to each type of optical information recording media 25 can be improved. Furthermore, since the degree of design freedom of the diffractive optical element 2 is high, the degree of design freedom of the optical pickup 4 is improved and the fabrication cost of the optical pickup 4 can be lowered.

EXAMPLES

Now, diffractive optical elements embodying the present invention will be described more specifically by using construction data, aberration diagrams and the like.

In the construction data mentioned in numerical examples described below, a surface number means the number of a lens surface counted from the side of a light source; a light source-lens distance means a distance (mm) from a light source to a diffractive optical element; and a disc thickness means a distance (mm) from a surface of an optical information recording medium 25 facing a light source to its information recording surface 26.

In each of the numerical examples described below, a lens surface provided with aspheric data is an aspheric surface and is obtained in accordance with the following formula (6):

$$X = \frac{\frac{1}{RD}h^2}{1+\sqrt{1-(1+CC)\left(\frac{1}{RD}\right)^2 h^2}} + \sum A_n h^n \quad \text{Formula (6)}$$

wherein X is a distance between a point on an aspheric surface with a height h from an optical axis and a tangential plane of the apex of the aspheric surface; h is a height from the optical axis; RD is a curvature radius on the apex of the aspheric surface; CC is a conic constant; and An is an aspheric coefficient of the nth order.

Also, a lens surface provided with coefficients of a phase function is a diffraction surface, and a phase difference caused by the diffraction surface is obtained in accordance with the following formula (7):

$$P = \Sigma M \cdot P_m h^m \quad \text{Formula (7)}$$

wherein P is a phase difference function; h is a height from an optical axis; $P_m$ is a coefficient of a phase function of the mth order; and M is a diffraction order.

Numerical Example 1

Numerical Example 1 corresponds to Embodiment 1 described above (see FIG. 1).

In this example, the first optical part has the following optical characteristics:

nd (refractive index to d line (of a wavelength of 587.6 nm)): 1.515 vd (Abbe number): 75.2

$n_{408}$ (refractive index to light of a wavelength of 408 nm): 1.52573

$n_{660}$ (refractive index to light of a wavelength of 660 nm): 1.51277

The second optical part has the following optical characteristics:

nd: 1.815 vd: 40.2

$n_{408}$: 1.84987.

$n_{660}$: 1.80876

The height of a relief was set to 4.12 μm. In this case, diffracted light with the largest quantity of light out of diffracted light for a laser beam of a wavelength of 408 nm was third-order diffracted light. On the other hand, diffracted light with the largest quantity of light out of diffracted light for a laser beam of a wavelength of 660 nm was second-order diffracted light.

Thus, high diffraction efficiency of 95% or more could be attained as follows:

Diffraction efficiency of the third-order diffracted light for the laser beam of the wavelength of 408 nm: 97.8%

Diffraction efficiency of the second-order diffracted light for the laser beam of the wavelength of 660 nm: 97.8%

It is noted that the aforementioned conditional formula (1-1) was satisfied as follows:

$$(m_1 \cdot \lambda_1(n_1(\lambda_2) - n_2(\lambda_2))/(m_2 \cdot \lambda_2(n_1(\lambda_1) - n_2(\lambda_1))): 0.847$$

Numerical Example 2

Numerical Example 2 corresponds to Embodiment 1 described above (see FIG. 1).

In this example, the first optical part has the following optical characteristics:

nd: 1.635 vd: 50.9

$n_{408}$: 1.65587

$n_{660}$: 1.63109

The second optical part has the following optical characteristics:

nd: 1.735 vd: 30.9

$n_{408}$: 1.77689

$n_{660}$: 1.72779

The height of a relief was set to 11.9 μm. In this case, diffracted light with the largest quantity of light out of diffracted light for a laser beam of a wavelength of 408 nm was third-order diffracted light. On the other hand, diffracted light with the largest quantity of light out of diffracted light for a laser beam of a wavelength of 660 nm was second-order diffracted light.

Thus, high diffraction efficiency of 90% or more could be attained as follows:

Diffraction efficiency of the third-order diffracted light for the laser beam of the wavelength of 408 nm: 92.9%

Diffraction efficiency of the second-order diffracted light for the laser beam of the wavelength of 660 nm: 92.9%

It is noted that the aforementioned conditional formula (1) was satisfied as follows:

$(m_1 \cdot \lambda_1(n_1(\lambda_2) - n_2(\lambda_2))/(m_2 \cdot \lambda_2(n_1(\lambda_1) - n_2(\lambda_1))): 0.741$ Numerical Example 3

Numerical Example 3 corresponds to Embodiment 1 described above (see FIG. 1).

In this example, the first optical part has the following optical characteristics:

nd: 1.517
vd: 55.6
$n_{408}$: 1.53237
$n_{660}$: 1.51406

The second optical part has the following optical characteristics:

nd: 1.717
vd: 30.6
$n_{408}$: 1.75829
$n_{660}$: 1.70990

The height of a relief was set to 3.49 μm. In this case, diffracted light with the largest quantity of light out of diffracted light for a laser beam of a wavelength of 408 nm was second-order diffracted light. On the other hand, diffracted light with the largest quantity of light out of diffracted light for a laser beam of a wavelength of 660 nm was first-order diffracted light.

Thus, high diffraction efficiency of 95% or more could be attained as follows:

Diffraction efficiency of the second-order diffracted light for the laser beam of the wavelength of 408 nm: 99.6%

Diffraction efficiency of the first-order diffracted light for the laser beam of the wavelength of 660 nm: 99.6%

It is noted that the aforementioned conditional formula (1-1) was satisfied as follows:

$(m_1 \cdot \lambda_1(n_1(\lambda_2) - n_2(\lambda_2))/(m_2 \cdot \lambda_2(n_1(\lambda_1) - n_2(\lambda_1))): 1.072$ Numerical Example 4

Numerical Example 4 corresponds to Embodiment 2 described above (see FIGS. 2 and 3).

Detailed data of Numerical Example 4 are listed in Tables 1 through 3 below.

Also, aspheric data of a first surface is listed in Table 4 and coefficients of the phase function of the first surface are listed in Table 5. Also, aspheric data of a second surface is listed in Table 6.

TABLE 1

| Focal length (mm) | 2.300 | 2.400 |
| --- | --- | --- |
| Wavelength (nm) | 408 | 660 |
| Light source-lens distance (mm) | ∞ | ∞ |
| Aperture (mm) | 2.88 | 2.88 |
| Working distance (WD) (mm) | 0.797 | 0.543 |
| Disc thickness (DT) (mm) | 0.1 | 0.6 |
| Diffraction order | 3 | 2 |

TABLE 2

| Surface Number | Curvature radius on apex (mm) | Thickness (mm) | Material | Notes |
| --- | --- | --- | --- | --- |
| 0 | ∞ | ∞ | Air | |
| 1 | 1.9634 | 2.500 | n1 | Diffraction surface |
| 2 | 10.9296 | WD | | Aspheric surface |

TABLE 2-continued

| Surface Number | Curvature radius on apex (mm) | Thickness (mm) | Material | Notes |
| --- | --- | --- | --- | --- |
| 3 | ∞ | | DT | disc |
| 4 | ∞ | 0 | | |

TABLE 3

| Wavelength (nm) | n1 | Disc |
| --- | --- | --- |
| 408 | 1.84987 | 1.61642 |
| 660 | 1.80876 | 1.57815 |

TABLE 4

| Aspheric surface | |
| --- | --- |
| RD | 1.9634 |
| CC | −0.7229646 |
| A4 | −1.289831E−03 |
| A6 | −6.298032E−04 |
| A8 | −4.889609E−04 |
| A10 | −7.871085E−05 |

TABLE 5

| Coefficients of phase function | |
| --- | --- |
| P2 | −7.906607E+01 |
| P4 | −3.696499E+01 |
| P6 | −3.628162E+00 |
| P8 | −2.712040E−01 |
| P10 | −3.041074E−01 |

TABLE 6

| RD | 10.9296 |
| --- | --- |
| CC | 0 |
| A4 | 6.150998E−02 |
| A6 | −2.155164E−01 |
| A8 | 2.394285E−01 |
| A10 | −8.795929E−02 |

Figure 6:
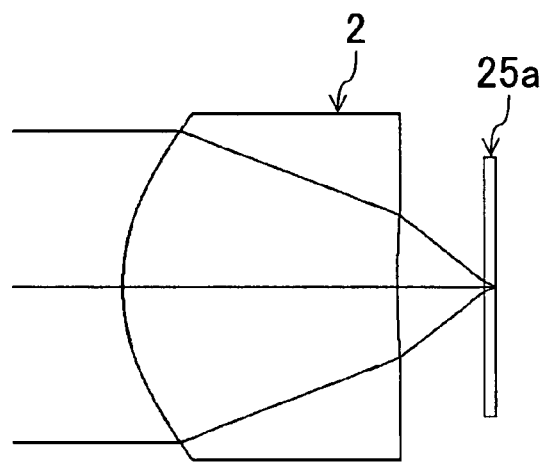
FIG. 6 is a diagram of an optical path of the diffractive optical element 2 disposed against a BD 25a (applicable to a wavelength of 408 nm and having a disc thickness of 0.1 mm) in Numerical Example 4.

FIG. 6 is a diagram of an optical path of the diffractive optical element 2 disposed against a BD 25a (applicable to a wavelength of 408 nm and having a disc thickness of 0.1 mm) in Numerical Example 4.

Figure 7:
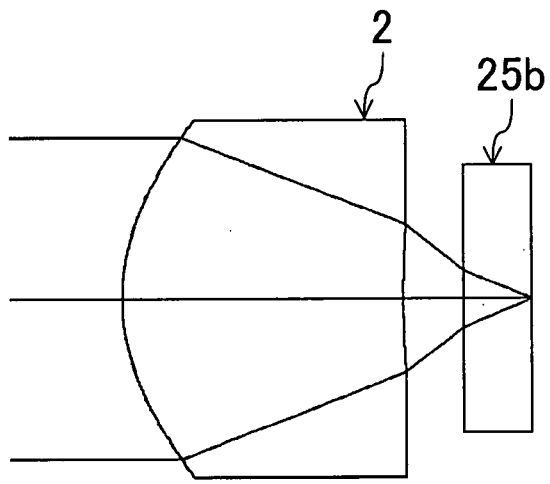
FIG. 7 is a diagram of an optical path of the diffractive optical element 2 disposed against a DVD 25b (applicable to a wavelength of 660 nm and having a disc thickness of 0.6 mm) in Numerical Example 4.

FIG. 7 is a diagram of an optical path of the diffractive optical element 2 disposed against a DVD 25b (applicable to a wavelength of 660 nm and having a disc thickness of 0.6 mm) in Numerical Example 4.

In this example, the first optical part has the following optical characteristics:

nd: 1.515
vd: 75.2
$n_{408}$: 1.52573
$n_{660}$: 1.51277

The second optical part has the following optical characteristics:

nd: 1.815
vd: 40.2
$n_{408}$: 1.84987
$n_{660}$: 1.80876

The height of a relief was set to 4.12 μm. In this case, diffracted light with the largest quantity of light out of diffracted light for a laser beam of a wavelength of 408 nm was third-order diffracted light. On the other hand, diffracted light with the largest quantity of light out of diffracted light for a laser beam of a wavelength of 660 nm was second-order diffracted light.

Thus, high diffraction efficiency of 95% or more could be attained as follows:

Diffraction efficiency of the third-order diffracted light for the laser beam of the wavelength of 408 nm: 97.8%

Diffraction efficiency of the second-order diffracted light for the laser beam of the wavelength of 660 nm: 97.8%

It is noted that the aforementioned conditional formula (1-1) was satisfied as follows:

$(m_1 \cdot \lambda_1 (n_1(\lambda_2) - n_2(\lambda_2))/(m_2 \cdot \lambda_2 (n_1(\lambda_1) - n_2(\lambda_1)))$: 0.847

Figure 8:
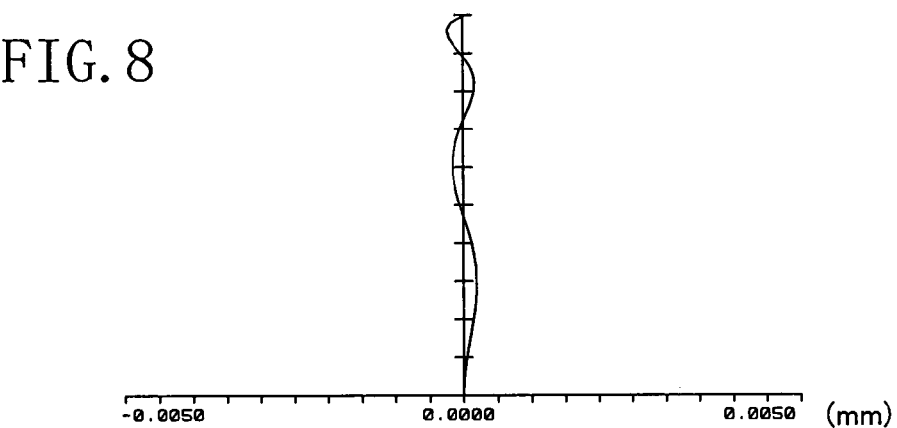
FIG. 8 is a diagram of aberration caused when light of a wavelength of 408 nm enters the diffractive optical element 2 in Numerical Example 4.
Figure 9:
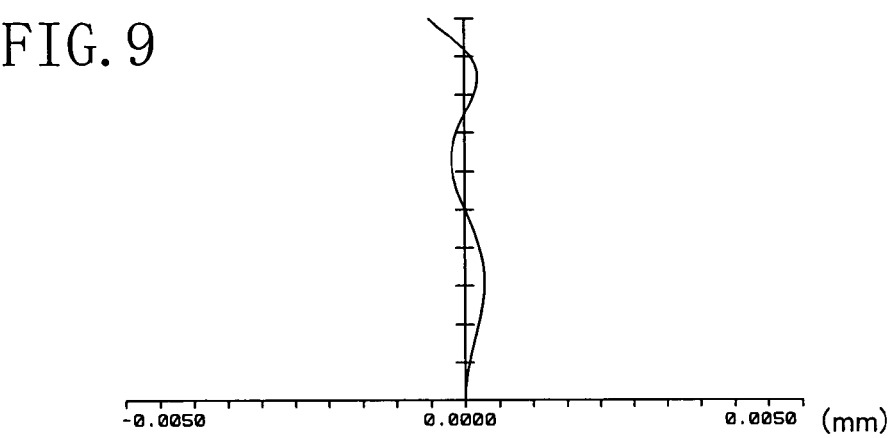
FIG. 9 is a diagram of aberration caused when light of a wavelength of 660 nm enters the diffractive optical element 2 in Numerical Example 4.

Furthermore, wavefront aberrations of Numerical Example 4 are listed in Table 7. FIG. 8 is a diagram of aberration caused when the light of the wavelength of 408 nm enters the diffractive optical element 2 in Numerical Example 4. FIG. 9 is a diagram of aberration caused when the light of the wavelength of 660 nm enters the diffractive optical element 2 in Numerical Example 4.

TABLE 7

| | Wavefront Aberration (in mλ) | |
|---|---|---|
| | Axial aberration | Abaxial aberration |
| 408 nm | 5.6 | 18.2 |
| 660 nm | 4.3 | 60.4 |

Numerical Example 5

Numerical Example 5 corresponds to Embodiment 2 described above (see FIGS. 2 and 3).

In Numerical Example 5 and other numerical examples described below, a lens is designed according to detailed data shown in tables described below merely in a region where a plurality of kinds of laser beams of different wavelengths enter, and in a region where a beam of one wavelength alone enters, a lens is designed to be optimum for the laser beam.

Detailed data of Numerical Example 5 are listed in Tables 8 through 10 below.

Also, aspheric data of a first surface is listed in Table 11 and coefficients of the phase function of the first surface are listed in Table 12. Also, aspheric data of a second surface is listed in Table 13.

TABLE 8

| Focal length (mm) | 2.313 | 2.400 |
|---|---|---|
| Wavelength (nm) | 408 | 660 |
| Light source-lens distance (mm) | ∞ | ∞ |
| Aperture (mm) | 3.91 | 2.88 |
| Working distance (WD) (mm) | 0.639 | 0.367 |
| Disc thickness (DT) (mm) | 0.1 | 0.6 |
| Diffraction order | 3 | 2 |
| NA | 0.85 | 0.62 |

TABLE 9

| Surface Number | Curvature radius on apex (mm) | Thickness (mm) | Material | Notes |
|---|---|---|---|---|
| 0 | ∞ | ∞ | Air | |
| 1 | 1.8609 | 2.500 | n1 | Diffraction surface |
| 2 | 3.0855 | WD | | Aspheric surface |

TABLE 9-continued

| Surface Number | Curvature radius on apex (mm) | Thickness (mm) | Material | Notes |
|---|---|---|---|---|
| 3 | ∞ | DT | disc | |
| 4 | ∞ | 0 | | |

TABLE 10

| Wavelength (nm) | n1 | disc |
|---|---|---|
| 408 | 1.84987 | 1.61642 |
| 660 | 1.80876 | 1.57815 |

TABLE 11

| | Aspheric surface |
|---|---|
| RD | 1.8609 |
| CC | −0.6790581 |
| A4 | 1.049159E−03 |
| A6 | −5.340197E−04 |
| A8 | −1.366773E−04 |
| A10 | −6.205655E−05 |
| A12 | −5.087325E−06 |
| A14 | 2.420949E−07 |
| A16 | −8.469920E−07 |

TABLE 12

| | Coefficients of phase function |
|---|---|
| P2 | −1.515280E+02 |
| P4 | −3.851231E+01 |
| P6 | −5.731904E+00 |
| P8 | −6.214818E−01 |
| P10 | −1.324050E−01 |

TABLE 13

| RD | 3.0855 |
|---|---|
| CC | 0 |
| A4 | 5.644361E−02 |
| A6 | −8.680361E−02 |
| A8 | −2.953529E−02 |
| A10 | 1.339546E−02 |
| A12 | 0.009475269 |
| A14 | 0.012097358 |
| A16 | −0.008228187 |

Figure 10:
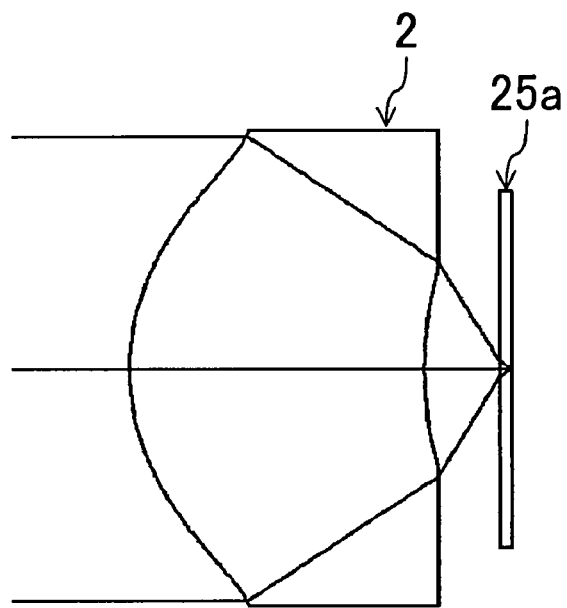
FIG. 10 is a diagram of an optical path of the diffractive optical element 2 disposed against a BD 25a (applicable to a wavelength of 408 nm and having a disc thickness of 0.1 mm) in Numerical Example 5.

FIG. 10 is a diagram of an optical path of the diffractive optical element disposed against a BD 25*a* (applicable to a wavelength of 408 nm and having a disc thickness of 0.1 mm) in Numerical Example 5.

Figure 11:
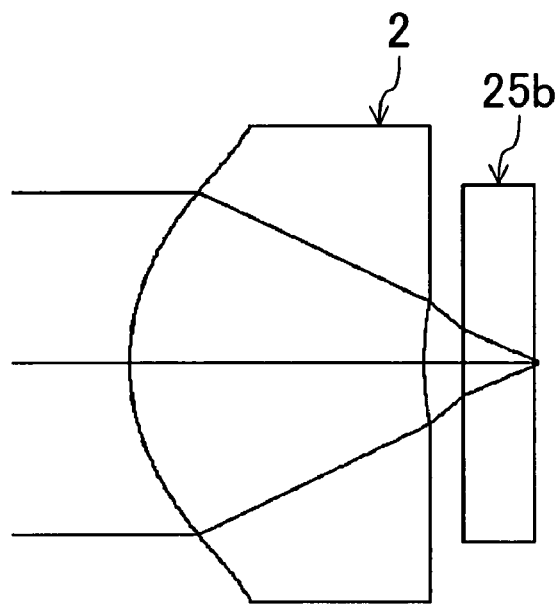
FIG. 11 is a diagram of an optical path of the diffractive optical element 2 disposed against a DVD 25b (applicable to a wavelength of 660 nm and having a disc thickness of 0.6 mm) in Numerical Example 5.

FIG. 11 is a diagram of an optical path of the diffractive optical element disposed against a DVD 25*b* (applicable to a wavelength of 660 nm and having a disc thickness of 0.6 mm) in Numerical Example 5.

In this example, the first optical part has the following optical characteristics:

$n_d$: 1.515

$v_d$: 75.2

$n_{408}$: 1.52573

$n_{660}$: 1.51277

The second optical part has the following optical characteristics:
nd: 1.815
vd: 40.2
$n_{408}$: 1.84987
$n_{660}$: 1.80876

As shown in Table 8, the effective diameter of a laser beam of a wavelength of 408 nm was set to 3.91 mm and the NA thereof was set to 0.85. The effective diameter of a laser beam of a wavelength of 660 nm was set to 2.88 mm and the NA thereof was set to 0.62. In a region of the effective diameter of 2.88 mm through 3.91 mm, a wavelength filter (not shown) is provided so as to transmit the laser beam of the wavelength of 408 nm and not to transmit the laser beam of the wavelength of 660 nm. Furthermore, in a region of the effective diameter of 2.88 mm through 3.91 mm where the laser beam of the wavelength of 408 nm alone passes, the height of a relief was set to 3.78 μm. On the other hand, in a region of the effective diameter less than 2.88 mm where both the laser beam of the wavelength of 408 nm and the laser beam of the wavelength of 660 nm pass, the height of the relief was set to 4.12 μm. In this case, in both the regions of the effective diameter less than 2.88 mm and the region of the effective diameter of 2.88 mm through 3.91 mm, diffracted light with the largest quantity of light out of diffracted light for the laser beam of the wavelength of 408 nm was third-order diffracted light. On the other hand, diffracted light with the largest quantity of light out of diffracted light for the laser beam of the wavelength of 660 nm was second-order diffracted light.

Thus, high diffraction efficiency of 95% or more could be attained as follows:

Diffraction efficiency of the third-order diffracted light for the laser beam of the wavelength of 408 nm attained in the region of the effective diameter less than 2.88 mm: 97.8%

Diffraction efficiency of the third-order diffracted light for the laser beam of the wavelength of 408 nm attained in the region of the effective diameter of 2.88 mm through 3.91 mm: 100%

Diffraction efficiency of the second-order diffracted light for the laser beam of the wavelength of 660 nm: 97.8%

It is noted that the aforementioned conditional formula (1-1) was satisfied as follows:

$(m_1 \cdot \lambda_1(n_1(\lambda_2)-n_2(\lambda_2)))/(m_2 \cdot \lambda_2(n_1(\lambda_1)-n_2(\lambda_1)))$: 0.847

Figure 12:
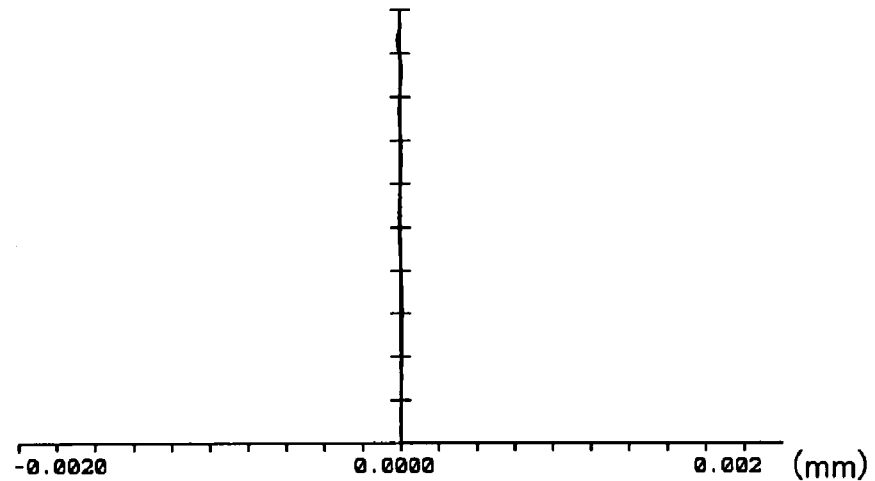
FIG. 12 is a diagram of aberration caused when light of a wavelength of 408 nm enters the diffractive optical element 2 in Numerical Example 5.
Figure 13:
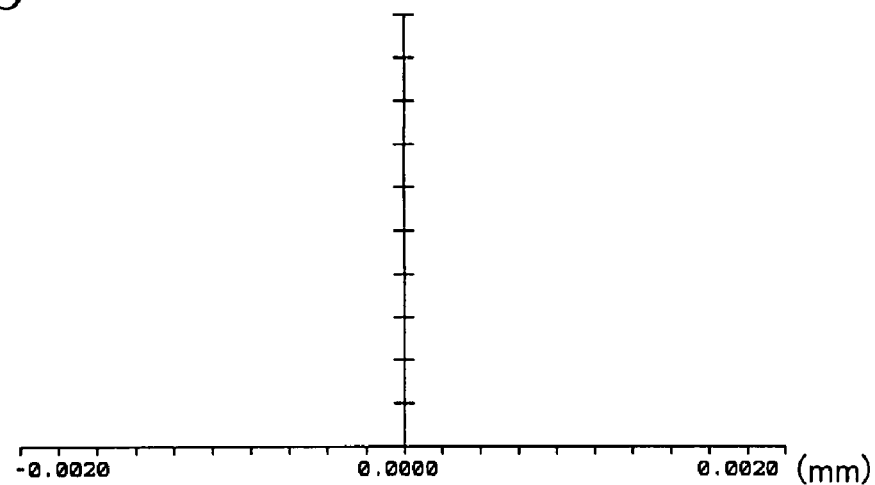
FIG. 13 is a diagram of aberration caused when light of a wavelength of 660 nm enters the diffractive optical element 2 in Numerical Example 5.

Furthermore, wavefront aberrations of Numerical Example 5 are listed in Table 14. FIG. 12 is a diagram of aberration caused when the light of the wavelength of 408 nm enters the diffractive optical element 2 in Numerical Example 5. FIG. 13 is a diagram of aberration caused when the light of the wavelength of 660 nm enters the diffractive optical element 2 in Numerical Example 5.

TABLE 14

| Wavefront Aberration (in mλ) | | |
|---|---|---|
| | Axial aberration | Abaxial aberration |
| 408 nm | 0.4 | 41.6 |
| 660 nm | 0.1 | 46.9 |

Numerical Example 6

Numerical Example 6 corresponds to Embodiment 2 described above (see FIGS. 2 and 3).

Detailed data of Numerical Example 6 are listed in Tables 15 through 17 below.

Also, aspheric data of a first surface is listed in Table 18 and coefficients of the phase function of the first surface are listed in Table 19. Also, aspheric data of a second surface is listed in Table 20.

TABLE 15

| | | |
|---|---|---|
| Focal length (mm) | 2.258 | 2.4 |
| Wavelength (nm) | 408 | 660 |
| Light source-lens distance (mm) | ∞ | ∞ |
| Aperture (mm) | 2.88 | 2.88 |
| Working distance (WD) (mm) | 0.874 | 0.668 |
| Disc thickness (DT) (mm) | 0.1 | 0.6 |
| Diffraction order | 2 | 1 |

TABLE 16

| Surface Number | Curvature radius on apex (mm) | Thickness (mm) | Material | Notes |
|---|---|---|---|---|
| 0 | ∞ | ∞ | Air | |
| 1 | 1.9248 | 2.600 | n1 | Diffraction surface |
| 2 | −6.7096 | WD | | Aspheric surface |
| 3 | ∞ | DT | disc | |
| 4 | ∞ | 0 | | |

TABLE 17

| Wavelength (nm) | n1 | disc |
|---|---|---|
| 408 | 1.75829 | 1.61642 |
| 660 | 1.70990 | 1.57815 |

TABLE 18

| Aspheric surface | |
|---|---|
| RD | 1.9248 |
| CC | −0.09159044 |
| A4 | 3.175216E−03 |
| A6 | −8.495488E−04 |
| A8 | 1.293105E−04 |
| A10 | −2.209691E−05 |

TABLE 19

| Coefficients of phase function | |
|---|---|
| P2 | −7.840987E+00 |
| P4 | 6.096281E+01 |
| P6 | 9.474989E−01 |
| P8 | 3.150453E+00 |
| P10 | 2.948275E−01 |

TABLE 20

| | |
|---|---|
| RD | −6.7096 |
| CC | 0 |
| A4 | 6.746856E−02 |
| A6 | −9.634297E−02 |
| A8 | 7.919891E−02 |
| A10 | −2.414605E−02 |

Figure 14:
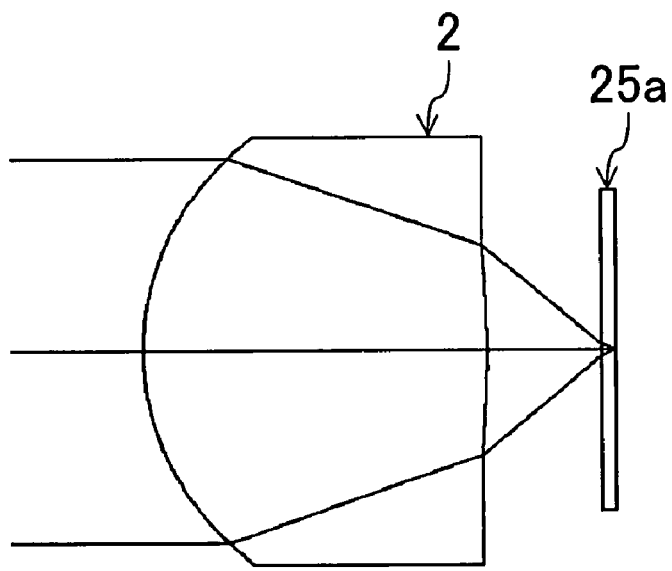
FIG. 14 is a diagram of an optical path of the diffractive optical element 2 disposed against a BD 25a (applicable to a wavelength of 408 nm and having a disc thickness of 0.1 mm) in Numerical Example 6.

FIG. 14 is a diagram of an optical path of the diffractive optical element 2 disposed against a BD 25a (applicable to a wavelength of 408 nm and having a disc thickness of 0.1 mm) in Numerical Example 6.

Figure 15:
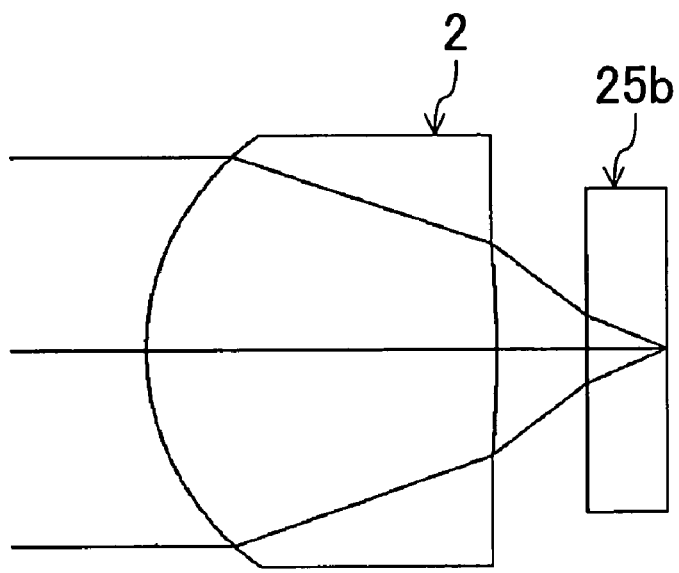
FIG. 15 is a diagram of an optical path of the diffractive optical element 2 disposed against a DVD 25b (applicable to a wavelength of 660 nm and having a disc thickness of 0.6 mm) in Numerical Example 6.

FIG. 15 is a diagram of an optical path of the diffractive optical element 2 disposed against a DVD 25b (applicable to a wavelength of 660 nm and having a disc thickness of 0.6 mm) in Numerical Example 6.

In this example, the first optical part has the following optical characteristics:
nd: 1.517
vd: 55.6
$n_{408}$: 1.53237
$n_{660}$: 1.51406

The second optical part has the following optical characteristics:
nd: 1.717
vd: 30.6
$n_{408}$: 1.75829
$n_{660}$: 1.70990

The height of a relief was set to 3.49 μm. In this case, diffracted light with the largest quantity of light out of diffracted light for a laser beam of a wavelength of 408 nm was second-order diffracted light. On the other hand, diffracted light with the largest quantity of light out of diffracted light for a laser beam of a wavelength of 660 nm was first-order diffracted light.

Thus, high diffraction efficiency of 95% or more could be attained as follows:

Diffraction efficiency of the second-order diffracted light for the laser beam of the wavelength of 408 nm: 99.6%

Diffraction efficiency of the first-order diffracted light for the laser beam of the wavelength of 660 nm: 99.6%

It is noted that the aforementioned conditional formula (1-1) was satisfied as follows:

$(m_1 \cdot \lambda_1 (n_1(\lambda_2) - n_2(\lambda_2))) / (m_2 \cdot \lambda_2 (n_1(\lambda_1) - n_2(\lambda_1)))$: 1.072

Figure 16:
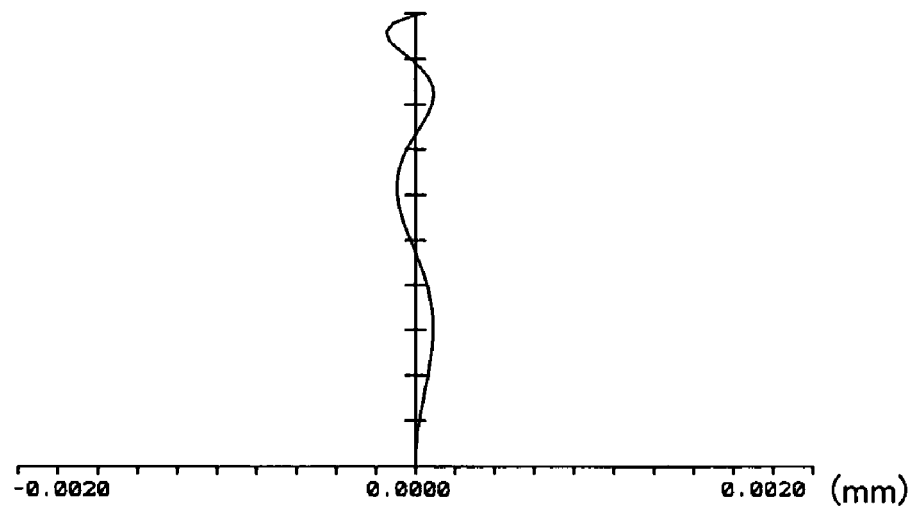
FIG. 16 is a diagram of aberration caused when light of a wavelength of 408 nm enters the diffractive optical element 2 in Numerical Example 6.
Figure 17:
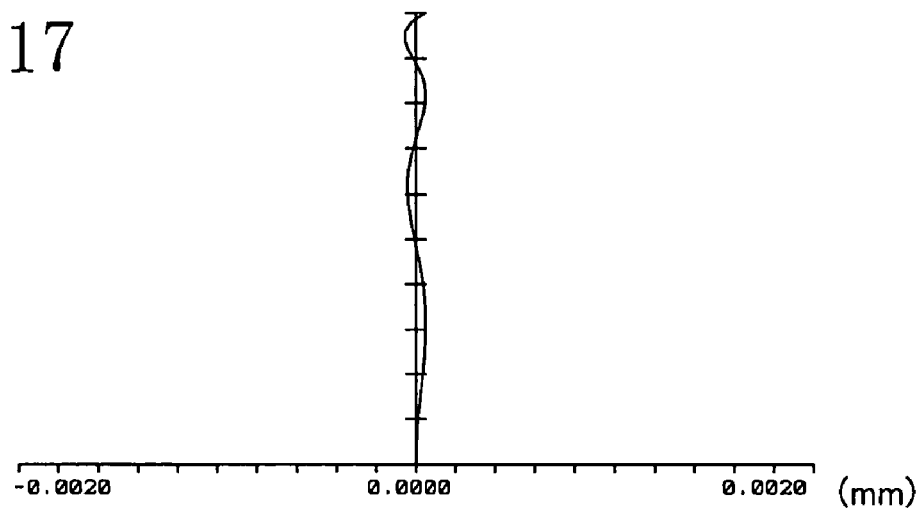
FIG. 17 is a diagram of aberration caused when light of a wavelength of 660 nm enters the diffractive optical element 2 in Numerical Example 6.

Furthermore, wavefront aberrations of Numerical Example 6 are listed in Table 21. FIG. 16 is a diagram of aberration caused when the light of the wavelength of 408 nm enters the diffractive optical element 2 in Numerical Example 6. FIG. 17 is a diagram of aberration caused when the light of the wavelength of 660 nm enters the diffractive optical element 2 in Numerical Example 6.

TABLE 21

| | Wavefront Aberration (in mλ) | |
|---|---|---|
| | Axial aberration | Abaxial aberration |
| 408 nm | 3.5 | 28.2 |
| 660 nm | 0.8 | 39.4 |

Numerical Example 7

Numerical Example 7 corresponds to Embodiment 1 described above (see FIG. 1).

In this example, the first optical part has the following optical characteristics:
nd: 1.596
vd: 29.8
$n_{408}$: 1.63131
$n_{660}$: 1.58995
$n_{780}$ (refractive index to light of a wavelength of 780 nm): 1.58347

The second optical part has the following optical characteristics:
nd: 1.796
vd: 44.8
$n_{408}$: 1.82620
$n_{660}$: 1.79049
$n_{780}$: 1.78438

The height of a relief was set to 6.876 μm. In this case, diffracted light with the largest quantity of light out of diffracted light for a laser beam of a wavelength of 408 nm was third-order diffracted light. On the other hand, diffracted light with the largest quantity of light out of diffracted light for a laser beam of a wavelength of 660 nm was second-order diffracted light. Furthermore, diffracted light with the largest quantity of light out of diffracted light for a laser beam of a wavelength of 780 nm was second-order diffracted light.

Thus, high diffraction efficiency of 90% or more could be attained as follows:

Diffraction efficiency of the third-order diffracted light for the laser beam of the wavelength of 408 nm: 97.6%

Diffraction efficiency of the second-order diffracted light for the laser beam of the wavelength of 660 nm: 99.4%

Diffraction efficiency of the second-order diffracted light for the laser beam of the wavelength of 780 nm: 94.6%

In particular, high diffraction efficiency of 95% or more could be attained in the laser beams of the wavelength of 408 nm and the wavelength of 660 nm.

It is noted that the aforementioned conditional formula (2) was satisfied as follows:

$(m_i \cdot \lambda_{408} / |n_1(\lambda_{408}) - n_2(\lambda_{408})|) / h$: 0.913

$(m_i \cdot \lambda_{660} / |n_1(\lambda_{660}) - n_2(\lambda_{660})|) / h$: 0.957

$(m_i \cdot \lambda_{780} / |n_1(\lambda_{780}) - n_2(\lambda_{780})|) / h$: 1.129

In particular, the conditional formula (2-1) was satisfied when the wavelength was 408 nm or 660 nm.

Numerical Example 8

Numerical Example 8 corresponds to Embodiment 1 described above (see FIG. 1).

In this example, the first optical part has the following optical characteristics:
nd: 1.450
vd: 72.7
$n_{408}$: 1.45976
$n_{660}$: 1.44799
$n_{780}$: 1.44564

The second optical part has the following optical characteristics:
nd: 1.850
vd: 37.7
$n_{408}$: 1.88903
$n_{660}$: 1.84309
$n_{780}$: 1.83555

The height of a relief was set to 1.857 μm. In this case, diffracted light with the largest quantity of light out of diffracted light for a laser beam of a wavelength of 408 nm was second-order diffracted light. On the other hand, diffracted light with the largest quantity of light out of diffracted light for a laser beam of a wavelength of 660 nm was first-order diffracted light. Furthermore, diffracted light with the largest quantity of light out of diffracted light for a laser beam of a wavelength of 780 nm was first-order diffracted light.

Thus, high diffraction efficiency of 95% or more could be attained as follows:

Diffraction efficiency of the second-order diffracted light for the laser beam of the wavelength of 408 nm: 99.8%

Diffraction efficiency of the first-order diffracted light for the laser beam of the wavelength of 660 nm: 96.7%

Diffraction efficiency of the first-order diffracted light for the laser beam of the wavelength of 780 nm: 98.1%

It is noted that the aforementioned conditional formula (2-1) was satisfied as follows:

$(m_i \cdot \lambda_{408}/|n_1(\lambda_{408}) - n_2(\lambda_{408})|)/h$: 1.023

$(m_i \cdot \lambda_{660}/|n_1(\lambda_{460}) - n_2(\lambda_{660})|)/h$: 0.899

$(m_i \cdot \lambda_{780}/|n_1(\lambda_{780}) - n_2(\lambda_{780})|)/h$: 1.077

Numerical Example 9

Numerical Example 9 corresponds to Embodiment 1 described above (see FIG. 1).

In this example, the first optical part has the following optical characteristics:
nd: 1.582
vd: 32.2
$n_{408}$: 1.61372
$n_{660}$: 1.57651
$n_{780}$: 1.57060

The second optical part has the following optical characteristics:
nd: 1.632
vd: 62.2
$n_{408}$: 1.64850
$n_{660}$: 1.62876
$n_{780}$: 1.62503

The height of a relief was set to 25.796 μm. In this case, diffracted light with the largest quantity of light out of diffracted light for a laser beam of a wavelength of 408 nm was second-order diffracted light. On the other hand, diffracted light with the largest quantity of light out of diffracted light for a laser beam of a wavelength of 660 nm was second-order diffracted light. Furthermore, diffracted light with the largest quantity of light out of diffracted light for a laser beam of a wavelength of 780 nm was second-order diffracted light.

Thus, high diffraction efficiency of 95% or more could be attained as follows:

Diffraction efficiency of the second-order diffracted light for the laser beam of the wavelength of 408 nm: 97.3%

Diffraction efficiency of the second-order diffracted light for the laser beam of the wavelength of 660 nm: 99.9%

Diffraction efficiency of the second-order diffracted light for the laser beam of the wavelength of 780 nm: 96.0%

It is noted that the aforementioned conditional formula (2-1) was satisfied as follows:

$(m_i \cdot \lambda_{408}/|n_1(\lambda_{408}) - n_2(\lambda_{408})|)/h$: 0.910

$(m_i \cdot \lambda_{660}/|n_1(\lambda_{660}) - n_2(\lambda_{660})|)/h$: 0.979

$(m_i \cdot \lambda_{780}/|n_1(\lambda_{780}) - n_2(\lambda_{780})|)/h$: 1.111

Numerical Example 10

Numerical Example 10 corresponds to Embodiment 2 described above (see FIGS. 2 and 3).

Detailed data of Numerical Example 10 are listed in Tables 22 through 24 below.

Also, aspheric data of a first surface is listed in Table 25 and coefficients of the phase function of the first surface are listed in Table 26. Also, aspheric data of a second surface is listed in Table 27.

TABLE 22

| Wavelength (nm) | 408 | 660 | 780 |
|---|---|---|---|
| Light source-lens distance (mm) | ∞ | ∞ | ∞ |

TABLE 22-continued

| Focal length (mm) | 2.380 | 2.454 | 2.400 |
|---|---|---|---|
| Aperture (mm) | 2.16 | 2.16 | 2.16 |
| Working distance (WD) (mm) | 0.954 | 0.682 | 0.25 |
| Disc thickness (DT) (mm) | 0.1 | 0.6 | 1.2 |
| Diffraction order | 3 | 2 | 2 |

TABLE 23

| Surface Number | Curvature radius on apex (mm) | Thickness (mm) | Material | Notes |
|---|---|---|---|---|
| 0 | ∞ | ∞ | Air | |
| 1 | 1.9171417 | 2.16478 | n1 | Diffraction surface |
| 2 | 5.555554 | WD | | Aspheric surface |
| 3 | ∞ | DT | disc | |
| 4 | ∞ | 0 | | |

TABLE 24

| Wavelength (nm) | n1 | Disc |
|---|---|---|
| 408 | 1.82620 | 1.61640 |
| 660 | 1.79049 | 1.57815 |
| 780 | 1.78438 | 1.57221 |

TABLE 25

| Aspheric surface | |
|---|---|
| RD | 1.9171417 |
| CC | −0.3442482 |
| A4 | −7.106507E−03 |
| A6 | −2.007969E−03 |
| A8 | 1.160066E−03 |
| A10 | −1.341351E−03 |

TABLE 26

| Coefficients of phase function | |
|---|---|
| P2 | −1.351989E+02 |
| P4 | −3.875370E+01 |
| P6 | −1.474224E+00 |
| P8 | 1.827447E+00 |
| P10 | −3.090479E+00 |

TABLE 27

| RD | 5.555554 |
|---|---|
| CC | 0 |
| A4 | 9.620685E−03 |
| A6 | −7.582633E−02 |
| A8 | −3.150065E−02 |
| A10 | 1.619287E−01 |

Figure 18:
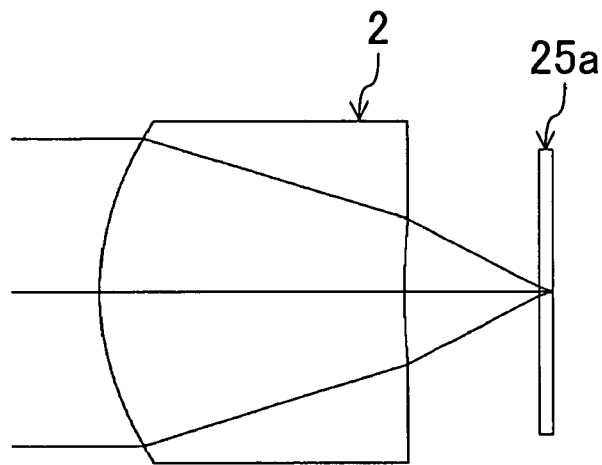
FIG. 18 is a diagram of an optical path of the diffractive optical element 2 disposed against a BD 25a (applicable to a wavelength of 408 nm and having a disc thickness of 0.1 mm) in Numerical Example 10.

FIG. 18 is a diagram of an optical path of the diffractive optical element 2 disposed against a BD 25a (applicable to a wavelength of 408 nm and having a disc thickness of 0.1 mm) in Numerical Example 10.

Figure 19:
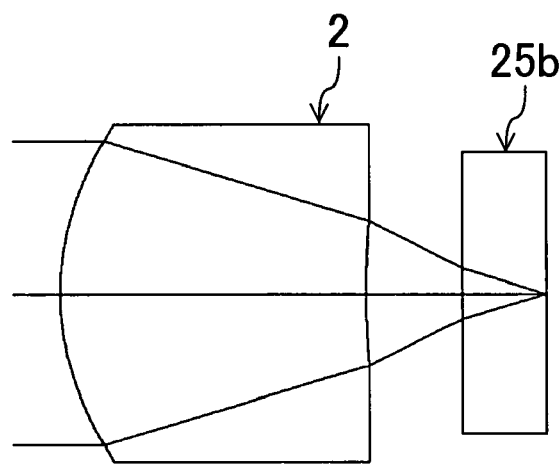
FIG. 19 is a diagram of an optical path of the diffractive optical element 2 disposed against a DVD 25b (applicable to a wavelength of 660 nm and having a disc thickness of 0.6 mm) in Numerical Example 10.

FIG. 19 is a diagram of an optical path of the diffractive optical element 2 disposed against a DVD 25b (applicable to a wavelength of 660 nm and having a disc thickness of 0.6 mm) in Numerical Example 10.

Figure 20:
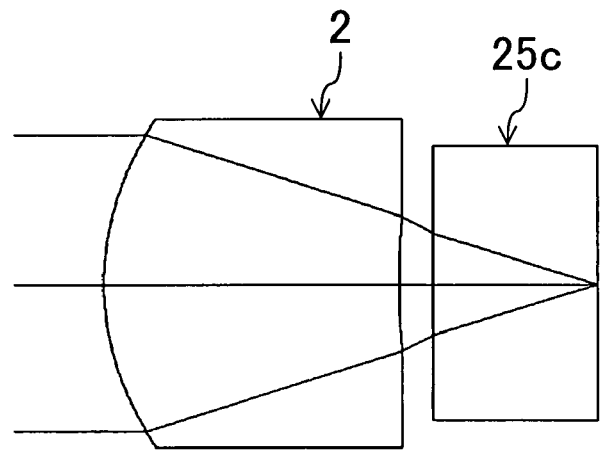
FIG. 20 is a diagram of an optical path of the diffractive optical element 2 disposed against a DVD 25b (applicable to a wavelength of 780 nm and having a disc thickness of 1.2 mm) in Numerical Example 10.

FIG. 20 is a diagram of an optical path of the diffractive optical element 2 disposed against a DVD 25b (applicable to a wavelength of 780 nm and having a disc thickness of 1.2 mm) in Numerical Example 10.

In this example, the first optical part has the following optical characteristics:
nd: 1.596
vd: 29.8
$n_{408}$: 1.63131
$n_{660}$: 1.58995
$n_{780}$: 1.58347

The second optical part has the following optical characteristics:
nd: 1.796
vd: 44.8
$n_{408}$: 1.82620
$n_{660}$: 1.79049
$n_{780}$: 1.78438

The height of a relief was set to 6.876 μm. In this case, diffracted light with the largest quantity of light out of diffracted light for a laser beam of a wavelength of 408 nm was third-order diffracted light. On the other hand, diffracted light with the largest quantity of light out of diffracted light for a laser beam of a wavelength of 660 nm was second-order diffracted light. Furthermore, diffracted light with the largest quantity of light out of diffracted light for a laser beam of a wavelength of 780 nm was second-order diffracted light.

Thus, high diffraction efficiency of 90% or more could be attained as follows:

Diffraction efficiency of the third-order diffracted light for the laser beam of the wavelength of 408 nm: 97.6%

Diffraction efficiency of the second-order diffracted light for the laser beam of the wavelength of 660 nm: 99.4%

Diffraction efficiency of the second-order diffracted light for the laser beam of the wavelength of 780 nm: 94.6%

In particular, high diffraction efficiency of 95% or more could be attained when the wavelength was 408 nm or 660 nm.

It is noted that the aforementioned conditional formula (2-1) was satisfied as follows:

$(m_i \cdot \lambda_{408}/|n_1(\lambda_{408})-n_2(\lambda_{408})|)/h$: 0.913

$(m_i \cdot \lambda_{660}/|n_1(\lambda_{660})-n_2(\lambda_{660})|)/h$: 0.957

$(m_i \cdot \lambda_{780}/|n_1(\lambda_{780})-n_2(\lambda_{780})|)/h$: 1.129

Figure 21:
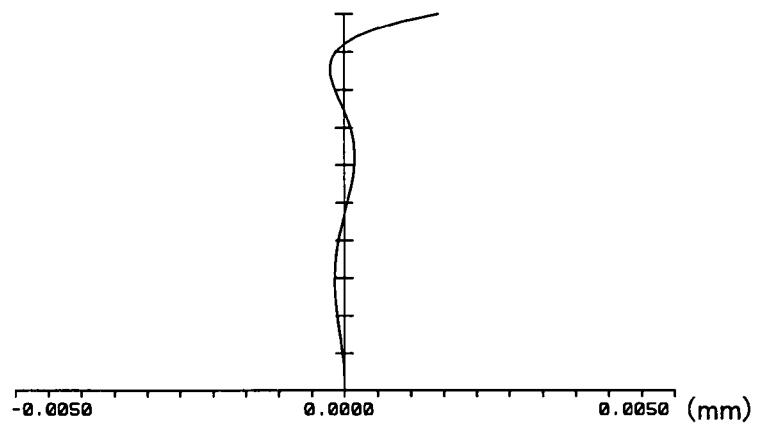
FIG. 21 is a diagram of aberration caused when light of a wavelength of 408 nm enters the diffractive optical element 2 in Numerical Example 10.
Figure 22:
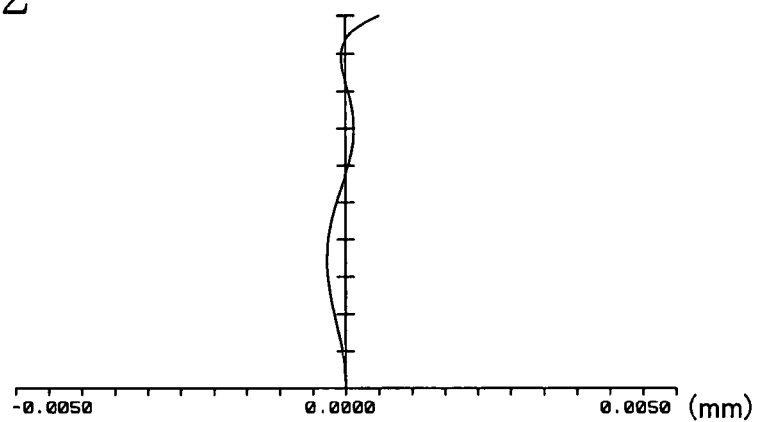
FIG. 22 is a diagram of aberration caused when light of a wavelength of 660 nm enters the diffractive optical element 2 in Numerical Example 10.
Figure 23:
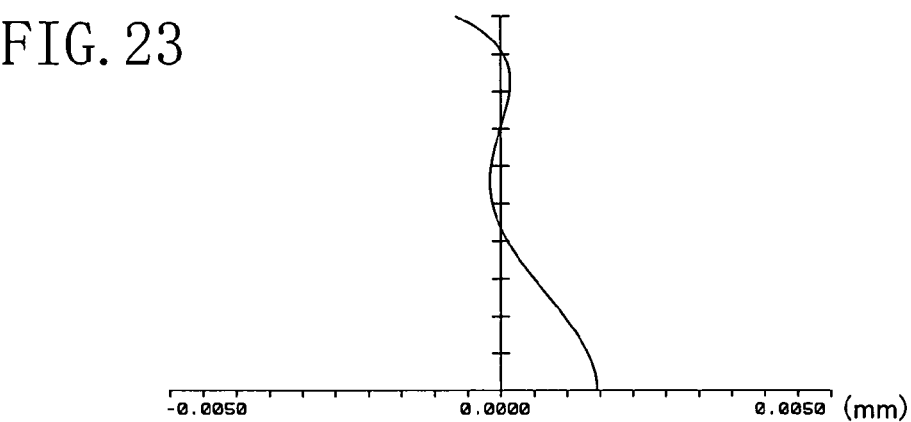
FIG. 23 is a diagram of aberration caused when light of a wavelength of 780 nm enters the diffractive optical element 2 in Numerical Example 10.

Furthermore, wavefront aberrations of Numerical Example 6 are listed in Table 28. FIG. 21 is a diagram of aberration caused when the light of the wavelength of 408 nm enters the diffractive optical element 2 in Numerical Example 10. FIG. 22 is a diagram of aberration caused when the light of the wavelength of 660 nm enters the diffractive optical element 2 in Numerical Example 10. FIG. 23 is a diagram of aberration caused when the light of the wavelength of 780 nm enters the diffractive optical element 2 in Numerical Example 10.

TABLE 28

Wavefront Aberration (in mλ)

| | Axial aberration | Abaxial aberration |
|---|---|---|
| 408 nm | 0.8 | 34.2 |
| 660 nm | 2.2 | 42.0 |
| 780 nm | 2.4 | 52.5 |

Numerical Example 11

Numerical Example 11 corresponds to Embodiment 2 described above (see FIGS. 2 and 3).

Detailed data of Numerical Example 11 are listed in Tables 29 through 31 below.

Also, aspheric data of a first surface is listed in Table 32 and coefficients of the phase function of the first surface are listed in Table 33. Also, aspheric data of a second surface is listed in Table 34.

TABLE 29

| Wavelength (nm) | 408 | 660 | 780 |
|---|---|---|---|
| Light source-lens distance (mm) | ∞ | 145.10800 | 34.04500 |
| Focal length (mm) | 2.240 | 2.621 | 2.400 |
| Aperture (mm) | 2.16 | 2.16 | 2.16 |
| Working distance (WD) (mm) | 0.740 | 0.731 | 0.320 |
| Disc thickness (DT) (mm) | 0.1 | 0.6 | 1.2 |
| Diffraction order | 2 | 1 | 1 |

TABLE 30

| Surface Number | Curvature radius on apex (mm) | Thickness (mm) | Material | Notes |
|---|---|---|---|---|
| 0 | ∞ | — | Air | |
| 1 | 2.2798 | 2.11 | n1 | Diffraction surface |
| 2 | 2.4826 | WD | | Aspheric surface |
| 3 | ∞ | DT | disc | |
| 4 | ∞ | 0 | | |

TABLE 31

| Wavelength (nm) | n1 | disc |
|---|---|---|
| 408 | 1.88903 | 1.61640 |
| 660 | 1.84309 | 1.57815 |
| 780 | 1.83555 | 1.57221 |

TABLE 32

| Aspheric surface | |
|---|---|
| RD | 2.2797969 |
| CC | 0.010799858 |
| A4 | −3.445101E−03 |
| A6 | −2.065122E−03 |
| A8 | 4.384370E−05 |
| A10 | −4.277117E−04 |

TABLE 33

| Coefficients of phase function | |
|---|---|
| P2 | −7.114019E+02 |
| P4 | −3.445261E+01 |
| P6 | −1.211500E+01 |
| P8 | 3.176488E+00 |
| P10 | −2.331451E+00 |

TABLE 34

| | |
|---|---|
| RD | 2.482566 |
| CC | 0 |
| A4 | −4.316588E−02 |
| A6 | −9.793945E−03 |

TABLE 34-continued

| | |
|---|---|
| A8 | −3.985120E−01 |
| A10 | 7.524872E−01 |

Figure 24:
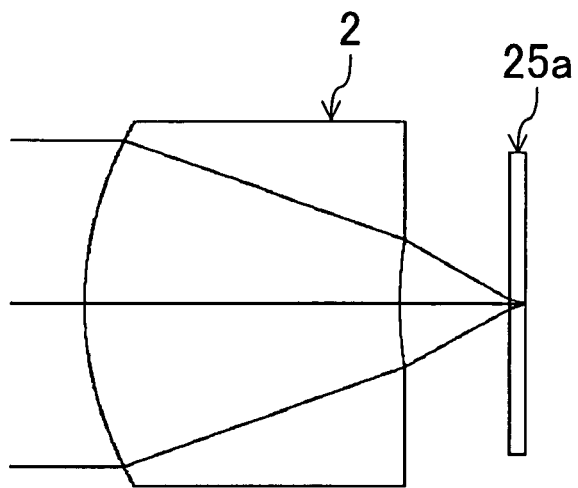
FIG. 24 is a diagram of an optical path of the diffractive optical element 2 disposed against a BD 25a (applicable to a wavelength of 408 nm and having a disc thickness of 0.1 mm) in Numerical Example 11.

FIG. 24 is a diagram of an optical path of the diffractive optical element 2 disposed against a BD 25a (applicable to a wavelength of 408 nm and having a disc thickness of 0.1 mm) in Numerical Example 11.

Figure 25:
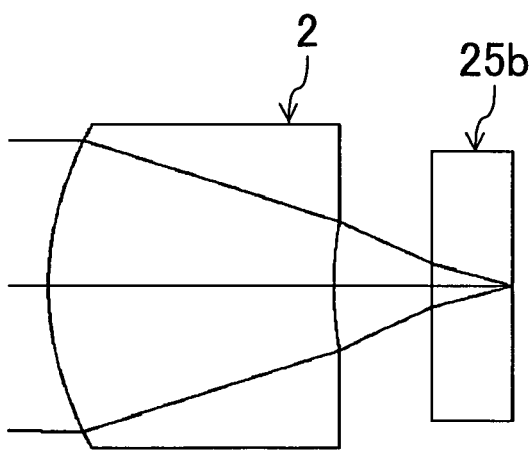
FIG. 25 is a diagram of an optical path of the diffractive optical element 2 disposed against a DVD 25b (applicable to a wavelength of 660 nm and having a disc thickness of 0.6 mm) in Numerical Example 11.

FIG. 25 is a diagram of an optical path of the diffractive optical element 2 disposed against a DVD 25b (applicable to a wavelength of 660 nm and having a disc thickness of 0.6 mm) in Numerical Example 11.

Figure 26:
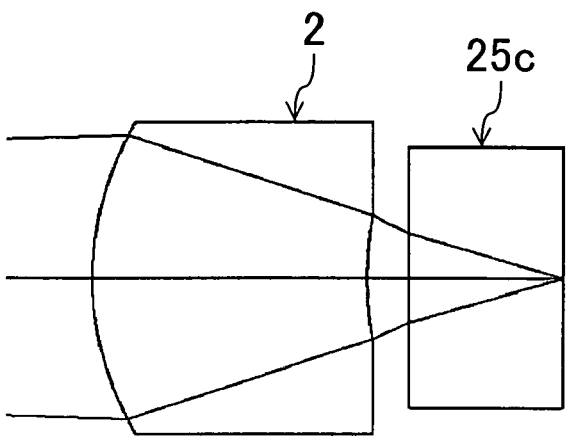
FIG. 26 is a diagram of an optical path of the diffractive optical element 2 disposed against a DVD 25b (applicable to a wavelength of 780 nm and having a disc thickness of 1.2 mm) in Numerical Example 11.

FIG. 26 is a diagram of an optical path of the diffractive optical element 2 disposed against a DVD 25b (applicable to a wavelength of 780 nm and having a disc thickness of 1.2 mm) in Numerical Example 11.

In this example, the first optical part has the following optical characteristics:

nd: 1.450
vd: 72.7
$n_{408}$: 1.45976
$n_{660}$: 1.44799
$n_{780}$: 1.44564

The second optical part has the following optical characteristics:

nd: 1.850
vd: 37.7
$n_{408}$: 1.88903
$n_{660}$: 1.84309
$n_{780}$: 1.83555

The height of a relief was set to 1.857 μm. In this case, diffracted light with the largest quantity of light out of diffracted light for a laser beam of a wavelength of 408 nm was second-order diffracted light. On the other hand, diffracted light with the largest quantity of light out of diffracted light for a laser beam of a wavelength of 660 nm was first-order diffracted light. Furthermore, diffracted light with the largest quantity of light out of diffracted light for a laser beam of a wavelength of 780 nm was first-order diffracted light.

Thus, high diffraction efficiency of 95% or more could be attained as follows:

Diffraction efficiency of the second-order diffracted light for the laser beam of the wavelength of 408 nm: 99.8%

Diffraction efficiency of the first-order diffracted light for the laser beam of the wavelength of 660 nm: 96.7%

Diffraction efficiency of the first-order diffracted light for the laser beam of the wavelength of 780 nm: 98.1%

It is noted that the aforementioned conditional formula (2-1) was satisfied as follows:

$(m_i \lambda_{408}/|n_1(\lambda_{408}) - n_2(\lambda_{408})|)/h$: 1.024

$(m_i \lambda_{660}/|n_1(\lambda_{660}) - n_2(\lambda_{660})|)/h$: 0.900

$(m_i \lambda_{780}/|n_1(\lambda_{780}) - n_2(\lambda_{780})|)/h$: 1.077

Figure 27:
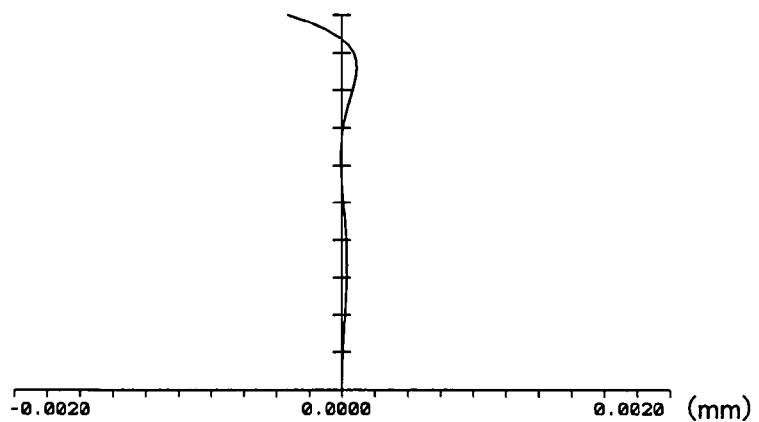
FIG. 27 is a diagram of aberration caused when light of a wavelength of 408 nm enters the diffractive optical element 2 in Numerical Example 11.
Figure 28:
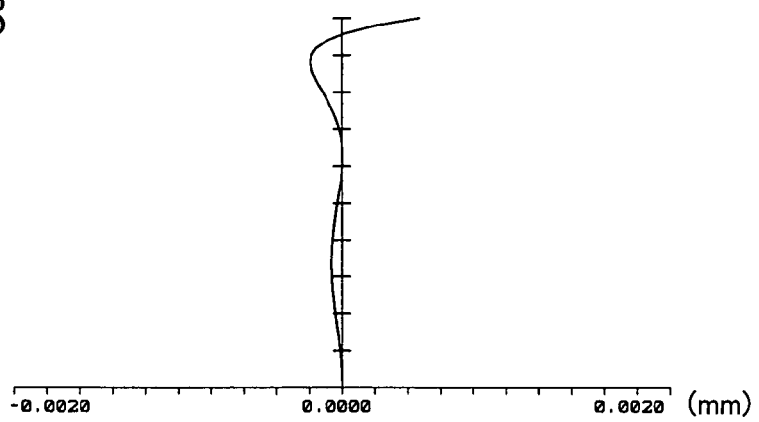
FIG. 28 is a diagram of aberration caused when light of a wavelength of 660 nm enters the diffractive optical element 2 in Numerical Example 11.
Figure 29:
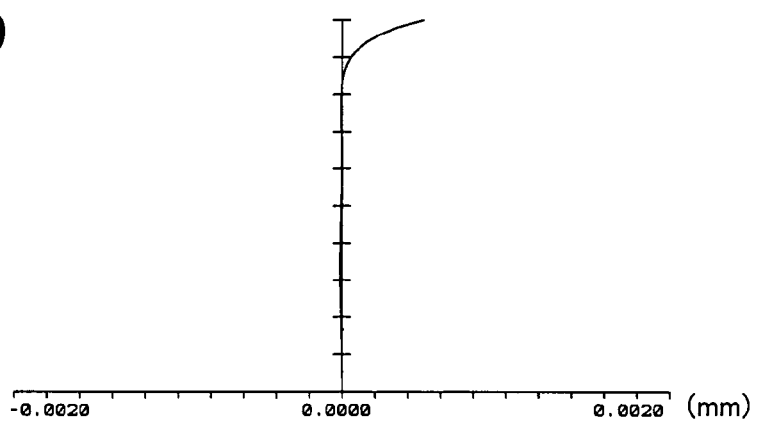
FIG. 29 is a diagram of aberration caused when light of a wavelength of 780 nm enters the diffractive optical element 2 in Numerical Example 11.

Furthermore, wavefront aberrations of Numerical Example 6 are listed in Table 35. FIG. 27 is a diagram of aberration caused when the light of the wavelength of 408 nm enters the diffractive optical element 2 in Numerical Example 11. FIG. 28 is a diagram of aberration caused when the light of the wavelength of 660 nm enters the diffractive optical element 2 in Numerical Example 11. FIG. 29 is a diagram of aberration caused when the light of the wavelength of 780 nm enters the diffractive optical element 2 in Numerical Example 11.

TABLE 35

| Wavefront Aberration (in mλ) | | |
|---|---|---|
| | Axial aberration | Abaxial aberration |
| 408 nm | 2.6 | 8.0 |
| 660 nm | 2.9 | 40.5 |
| 780 nm | 0.9 | 47.7 |

Numerical Example 12

Numerical Example 12 corresponds to Embodiment 2 described above (see FIGS. 2 and 3).

Detailed data of Numerical Example 12 are listed in Tables 36 through 38 below.

Also, aspheric data of a first surface is listed in Table 39 and coefficients of the phase function of the first surface are listed in Table 40. Also, aspheric data of a second surface is listed in Table 41.

TABLE 36

| Wavelength (nm) | 408 | 660 | 780 |
|---|---|---|---|
| Light source-lens distance (mm) | ∞ | ∞ | 81.41400 |
| Focal Length (mm) | 2.271 | 2.371 | 2.400 |
| Aperture (mm) | 2.16 | 2.16 | 2.16 |
| Working distance (WD) (mm) | 0.909 | 0.682 | 0.400 |
| Disc thickness (DT) (mm) | 0.1 | 0.6 | 1.2 |
| Diffraction order | 2 | 2 | 2 |

TABLE 37

| Surface Number | Curvature radius on apex (mm) | Thickness (mm) | Material | Notes |
|---|---|---|---|---|
| 0 | ∞ | — | Air | |
| 1 | 1.5694 | 2.344 | n1 | Diffraction surface |
| 2 | −7.3501 | WD | | Aspheric surface |
| 3 | ∞ | DT | disc | |
| 4 | ∞ | 0 | | |

TABLE 38

| Wavelength (nm) | n1 | disc |
|---|---|---|
| 408 | 1.64850 | 1.61640 |
| 660 | 1.62876 | 1.57815 |
| 780 | 1.62503 | 1.57221 |

TABLE 39

| | Aspheric surface |
|---|---|
| RD | 1.5693708 |
| CC | −0.089131978 |
| A4 | −1.620548E−02 |
| A6 | −5.484649E−03 |
| A8 | −9.311309E−04 |
| A10 | −6.956374E−04 |

TABLE 40

| | Coefficients of phase function |
|---|---|
| P2 | 4.082903E+01 |
| P4 | −3.207559E+00 |

TABLE 40-continued

| | Coefficients of phase function |
|---|---|
| P6 | −6.199177E+00 |
| P8 | 3.882389E+00 |
| P10 | −2.368276E+00 |

TABLE 41

| RD | −7.350077 |
|---|---|
| CC | 0 |
| A4 | 4.014944E−03 |
| A6 | 9.051197E−02 |
| A8 | −2.299125E−01 |
| A10 | 3.538371E−01 |

Figure 30:
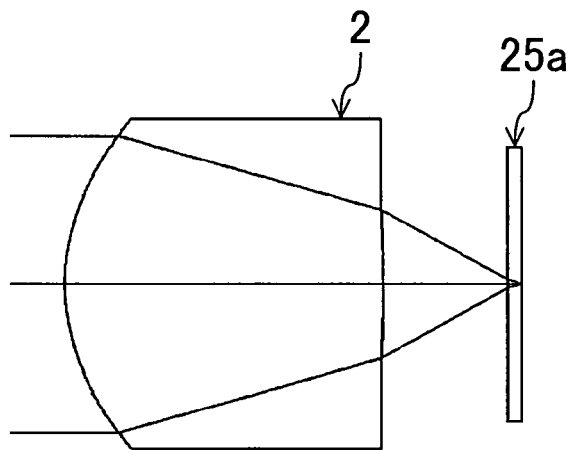
FIG. 30 is a diagram of an optical path of the diffractive optical element 2 disposed against a BD 25a (applicable to a wavelength of 408 nm and having a disc thickness of 0.1 mm) in Numerical Example 12.

FIG. 30 is a diagram of an optical path of the diffractive optical element 2 disposed against a BD 25a (applicable to a wavelength of 408 nm and having a disc thickness of 0.1 mm) in Numerical Example 12.

Figure 31:
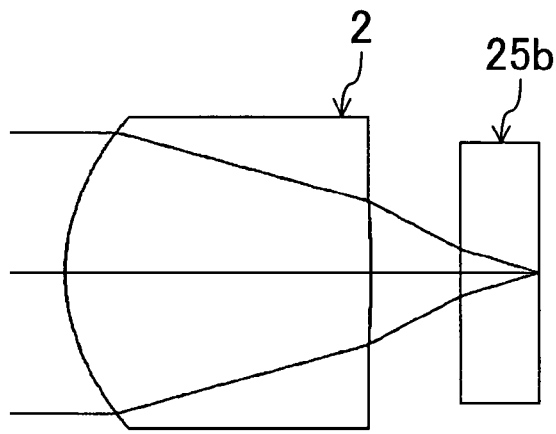
FIG. 31 is a diagram of an optical path of the diffractive optical element 2 disposed against a DVD 25b (applicable to a wavelength of 660 nm and having a disc thickness of 0.6 mm) in Numerical Example 12.

FIG. 31 is a diagram of an optical path of the diffractive optical element 2 disposed against a DVD 25b (applicable to a wavelength of 660 nm and having a disc thickness of 0.6 mm) in Numerical Example 12.

Figure 32:
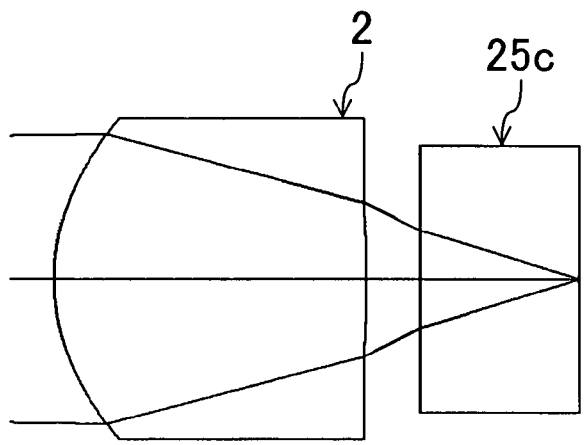
FIG. 32 is a diagram of an optical path of the diffractive optical element 2 disposed against a DVD 25b (applicable to a wavelength of 780 nm and having a disc thickness of 1.2 mm) in Numerical Example 12.

FIG. 32 is a diagram of an optical path of the diffractive optical element 2 disposed against a DVD 25b (applicable to a wavelength of 780 nm and having a disc thickness of 1.2 mm) in Numerical Example 12.

In this example, the first optical part has the following optical characteristics:

nd: 1.582
vd: 32.2
$n_{408}$: 1.61372
$n_{660}$: 1.57651
$n_{780}$: 1.57060

The second optical part has the following optical characteristics:

nd: 1.632
vd: 62.2
$n_{408}$: 1.64850
$n_{660}$: 1.62876
$n_{780}$: 1.62503

The height of a relief was set to 25.796 μm. In this case, diffracted light with the largest quantity of light out of diffracted light for a laser beam of a wavelength of 408 nm was second-order diffracted light. On the other hand, diffracted light with the largest quantity of light out of diffracted light for a laser beam of a wavelength of 660 nm was second-order diffracted light. Furthermore, diffracted light with the largest quantity of light out of diffracted light for a laser beam of a wavelength of 780 nm was second-order diffracted light.

Thus, high diffraction efficiency of 95% or more could be attained as follows:

Diffraction efficiency of the second-order diffracted light for the laser beam of the wavelength of 408 nm: 97.3%

Diffraction efficiency of the second-order diffracted light for the laser beam of the wavelength of 660 nm: 99.9%

Diffraction efficiency of the second-order diffracted light for the laser beam of the wavelength of 780 nm: 96.0%

It is noted that the aforementioned conditional formula (2-1) was satisfied as follows:

$(m_i \cdot \lambda_{408}/|n_1(\lambda_{408}) - n_2(\lambda_{408})|)/h$: 0.909

$(m_i \cdot \lambda_{660}/|n_1(\lambda_{660}) - n_2(\lambda_{660})|)/h$: 0.979

$(m_i \cdot \lambda_{780}/|n_1(\lambda_{780}) - n_2(\lambda_{780})|)/h$: 1.111

Figure 33:
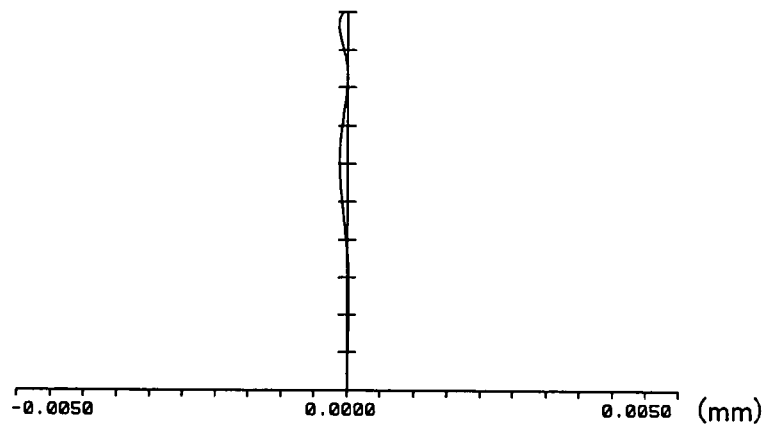
FIG. 33 is a diagram of aberration caused when light of a wavelength of 408 nm enters the diffractive optical element 2 in Numerical Example 12.
Figure 34:
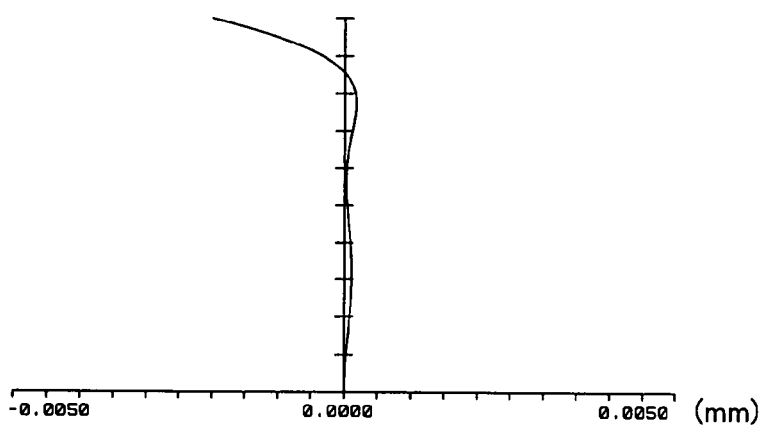
FIG. 34 is a diagram of aberration caused when light of a wavelength of 660 nm enters the diffractive optical element 2 in Numerical Example 12.
Figure 34:
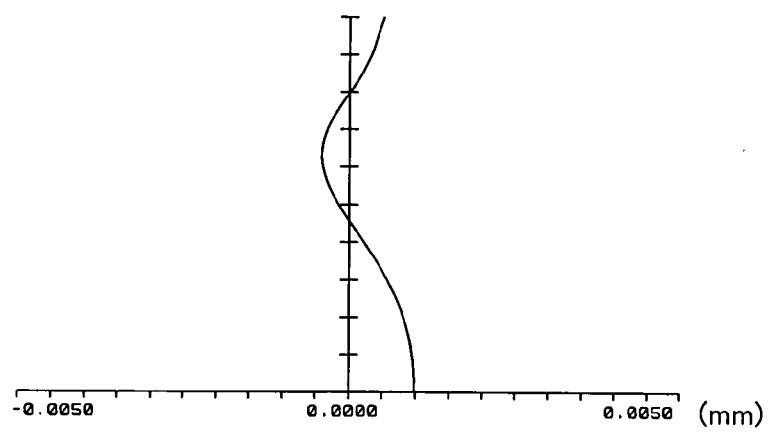

Furthermore, wavefront aberrations of Numerical Example 6 are listed in Table 42. FIG. 33 is a diagram of aberration caused when the light of the wavelength of 408 nm enters the diffractive optical element 2 in Numerical Example 12. FIG. 34 is a diagram of aberration caused when the light of the wavelength of 660 nm enters the diffractive optical element 2 in Numerical Example 12. FIG. 35 is a diagram of aberration caused when the light of the wavelength of 780 nm enters the diffractive optical element 2 in Numerical Example 12.

TABLE 42

| | Wavefront Aberration (in mλ) | |
|---|---|---|
| | Axial aberration | Abaxial aberration |
| 408 nm | 5.2 | 34.0 |
| 660 nm | 6.2 | 35.1 |
| 780 nm | 5.3 | 45.2 |

Since the diffractive optical element of this invention has diffraction efficiency with low wavelength dependency and a high degree of design freedom, it is useful for various optical systems including an objective optical system such as an imaging optical system, a lighting optical system and a scanning optical system. Furthermore, it is useful for optical devices including any of these optical systems such as an optical pickup, an imaging device, a lighting device, an image forming device (like a copying machine or a printer), and an image reading device (such as a scanner).

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A diffractive optical element comprising a first optical part and a second optical part bonded to each other with a bonded surface therebetween formed as a diffraction surface for diffracting a plurality of kinds of laser beams of different wavelengths on said diffraction surface, wherein:

diffracted light with the largest quantity of light out of diffracted light for at least one of said plurality of kinds of laser beams obtained on said diffraction surface has a second or higher diffraction order, wherein said plurality of kinds of laser beams include a first laser beam of a first wavelength and a second laser beam of a second wavelength different from said first wavelength, and the following conditional formula (1) is satisfied in a region where at least said first laser beam and said second laser beam enter:

$0.7 < (m_1 \cdot \lambda_1 (n_1(\lambda_2) - n_2(\lambda_2))) / (m_2 \cdot \lambda_2 (n_1(\lambda_1) - n_2(\lambda_1))) < 1.3$  Formula (1):

wherein $m_1$ is a diffraction order of diffracted light with the largest quantity of light out of diffracted light for said first laser beam obtained on said diffraction surface; $m_2$ is a diffraction order of diffracted light with the largest quantity of light out of diffracted light for said second laser beam obtained on said diffraction surface; $\lambda_1$ is said first wavelength; $\lambda_2$ is said second wavelength; $n_1(\lambda_1)$ is a refractive index of said first optical part to said first laser beam; $n_1(\lambda_2)$ is a refractive index of said first optical part to said second laser beam; $n_2(\lambda_1)$ is a refractive index of said second optical part to said first laser beam; and $n_2(\lambda_2)$ is a refractive index of said second optical part to said second laser beam.

2. The diffractive optical element of claim 1, wherein said diffraction surface is formed of a plurality of regularly arranged structural units, each being a concave and/or a convex, said plurality of kinds of laser beams include first through kth laser beams, and the following conditional formula (2) is satisfied in a region where at least two or more of said plurality of kinds of laser beams enter:

$$0.83<(m_i\cdot\lambda_i/|n_1(\lambda_i)-n_2(\lambda_i)|)/h<1.17 \qquad \text{Formula (2):}$$

wherein $m_i$ is a diffraction order of diffracted light with the largest quantity of light out of diffracted light for an ith laser beam obtained on said diffraction surface; $\lambda_i$ is a wavelength of said ith laser beam; $n_1(\lambda_i)$ is a refractive index of said first optical part to said ith laser beam; $n_2(\lambda_i)$ is a refractive index of said second optical part to said ith laser beam; h is a height of each of said structural units along an optical axis; and i =1, 2, ... , k.

3. The diffractive optical element of claim 1, wherein said diffraction surface is formed of a plurality of regularly arranged structural units, each being a concave and/or a convex, said plurality of kinds of laser beams include a first laser beam of a first wavelength, a second laser beam of a second wavelength different from said first wavelength and a third laser beam of a third wavelength different from said first wavelength and said second wavelength, and the following conditional formulas (3) through (5) are satisfied in a region where at least two of said first through third laser beams enter:

$$0.83<(m_1\cdot\lambda_1/|n_1(\lambda_1)-n_2(\lambda_1)|)/h<1.17 \qquad \text{Formula (3):}$$

$$0.83<(m_2\cdot\lambda_2/|n_1(\lambda_2)-n_2(\lambda_2)|)/h<1.17 \qquad \text{Formula (4):}$$

$$0.83<(m_3\cdot\lambda_3/|n_1(\lambda_3)-n_2(\lambda_3)|)/h<1.17 \qquad \text{Formula (5):}$$

wherein $m_1$ is a diffraction order of diffracted light with the largest quantity of light out of diffracted light for said first laser beam obtained on said diffraction surface; $m_2$ is a diffraction order of diffracted light with the largest quantity of light out of diffracted light for said second laser beam obtained on said diffraction surface; $m_3$ is a diffraction order of diffracted light with the largest quantity of light out of diffracted light for said third laser beam obtained on said diffraction surface; $\lambda_1$ is said first wavelength; $\lambda_2$ is said second wavelength; $\lambda_3$ is said third wavelength; $n_1(\lambda_1)$ is a refractive index of said first optical part to said first laser beam; $n_1(\lambda_2)$ is a refractive index of said first optical part to said second laser beam; $n_1(\lambda_3)$ is a refractive index of said first optical part to said third laser beam; $n_2(\lambda_2)$ is a refractive index of said second optical part to said first laser beam; $n_2(\lambda_2)$ is a refractive index of said second optical part to said second laser beam; $n_2(\lambda_3)$ is a refractive index of said second optical part to said third laser beam; and h is a height of each of said structural units along an optical axis.

4. An objective optical system for focusing each of a plurality of kinds of laser beams of different wavelengths on an information recording surface of an optical information recording medium, comprising at least a diffractive optical element including a first optical part and a second optical part bonded to each other with a bonded surface therebetween formed as a diffraction surface, for diffracting said plurality of kinds of laser beams on said diffraction surface, wherein:

diffracted light with the largest quantity of light out of diffracted light for at least one of said plurality of kinds of laser beams obtained on said diffraction surface of said diffractive optical element has a second or higher diffraction order, wherein said plurality of kinds of laser beams include a first laser beam of a first wavelength and a second laser beam of a second wavelength different from said first wavelength, and the following conditional formula (1) is satisfied in a region of said diffractive optical element where at least said first laser beam and said second laser beam enter:

$$0.7<(m_1\cdot\lambda_1(n_1(\lambda_2)-(n_2(\lambda_2))/(m_2\cdot\lambda_2(n_1(\lambda_1)-(n_2(\lambda_1))<1.3 \qquad \text{Formula (1):}$$

wherein $m_1$ is a diffraction order of diffracted light with the largest quantity of light out of diffracted light for said first laser beam obtained on said diffraction surface; $m_2$ is a diffraction order of diffracted light with the largest quantity of light out of diffracted light for said second laser beam obtained on said diffraction surface; $\lambda_1$ is said first wavelength; $\lambda_2$ is said second wavelength; $n_1(\lambda_1)$ is a refractive index of said first optical part to said first laser beam; $n_1(\lambda_2)$ is a refractive index of said first optical part to said second laser beam; $n_2(\lambda_1)$ is a refractive index of said second optical part to said first laser beam; and $n_2(\lambda_2)$ is a refractive index of said second optical part to said second laser beam.

5. The objective optical system of claim 4, further comprising an objective lens for focusing each of said plurality of kinds of laser beams having passed through said diffractive optical element on said information recording surface.

6. The objective optical system of claim 4, wherein said diffractive optical element focuses each of said plurality of kinds of laser beams on said information recording surface.

7. The objective optical system of claim 4, wherein said diffraction surface is formed of a plurality of regularly arranged structural units, each being a concave and/or a convex, said plurality of kinds of laser beams include first through kth laser beams, and the following conditional formula (2) is satisfied in a region of said diffractive optical element where at least two or more of said plurality of kinds of laser beams enter:

$$0.83<(m_i\cdot\lambda_i/|n_1(\lambda_i)-n_2(\lambda_i)|)/h<1.17 \qquad \text{Formula (2):}$$

wherein $m_i$ is a diffraction order of diffracted light with the largest quantity of light out of diffracted light for an ith laser beam obtained on said diffraction surface; $\lambda_i$ is a wavelength of said ith laser beam; $n_1(\lambda_i)$ is a refractive index of said first optical part to said ith laser beam; $n_2(\lambda_i)$ is a refractive index of said second optical part to said ith laser beam; h is a height of each of said structural units along an optical axis; and i =1, 2, ... , k.

8. The objective optical system of claim 4, wherein said diffraction surface is formed of a plurality of regularly arranged structural units, each being a concave and/or a convex, said plurality of kinds of laser beams include a first laser beam of a first wavelength, a second laser beam of a second wavelength different from said first wavelength and a third laser beam of a third wavelength different from said first wavelength and said second wavelength, and the following conditional formulas (3) through (5) are satisfied in a region of said diffractive optical element where at least two of said first through third laser beams enter:

$$0.83 < (m_1 \cdot \lambda_1/|n_1(\lambda_1) - n_2(\lambda_1)|)/h < 1.17 \qquad \text{Formula (3):}$$

$$0.83 < (m_2 \cdot \lambda_2/|n_1(\lambda_2) - n_2(\lambda_2)|)/h < 1.17 \qquad \text{Formula (4):}$$

$$0.83 < (m_3 \cdot \lambda_3/|n_1(\lambda_3) - n_2(\lambda_3)|)/h < 1.17 \qquad \text{Formula (5):}$$

wherein $m_1$ is a diffraction order of diffracted light with the largest quantity of light out of diffracted light for said first laser beam obtained on said diffraction surface; $m_2$ is a diffraction order of diffracted light with the largest quantity of light out of diffracted light for said second laser beam obtained on said diffraction surface; $m_3$ is a diffraction order of diffracted light with the largest quantity of light out of diffracted light for said third laser beam obtained on said diffraction surface; $\lambda_1$ is said first wavelength; $\lambda_2$ is said second wavelength; $\lambda_3$ is said third wavelength; $n_1(\lambda_1)$ is a refractive index of said first optical part to said first laser beam; $n_1(\lambda_2)$ is a refractive index of said first optical part to said second laser beam; $n_1(\lambda_3)$ is a refractive index of said first optical part to said third laser beam; $n_2(\lambda_1)$ is a refractive index of said second optical part to said first laser beam; $n_2(\lambda_2)$ is a refractive index of said second optical part to said second laser beam; $n_2(\lambda_3)$ is a refractive index of said second optical part to said third laser beam; and h is a height of each of said structural units along an optical axis.

9. An optical pickup for focusing a laser beam on an information recording surface of an optical information recording medium, comprising:

a light source for emitting a plurality of kinds of laser beams of different wavelengths; and an objective optical system for focusing each of said plurality of kinds of laser beams emitted from said light source onto said information recording surface, wherein:

said objective optical system contains at least a diffractive optical element including a first optical part and a second optical part bonded to each other with a bonded surface therebetween formed as a diffraction surface for diffracting each of said plurality of kinds of laser beams emitted from said light source on said diffraction surface, and diffracted light with the largest quantity of light out of diffracted light for at least one of said plurality of kinds of laser beams obtained on said diffraction surface of said diffractive optical element has a second or higher diffraction order, wherein said light source at least emits, as said plurality of kinds of laser beams, a first laser beam of a first wavelength and a second laser beam of a second wavelength different from said first wavelength, and the following conditional formula (1) is satisfied in a region of said diffractive optical element where at least said first laser beam and said second laser beam enter:

$$0.7 < (m_1 \cdot \lambda_1 (n_1(\lambda_2) - (n_2(\lambda_2))/(m_2 \cdot \lambda_2 (n_1(\lambda_1) - (n_2(\lambda_1))) < 1.3 \qquad \text{Formula (1):}$$

wherein $m_1$ is a diffraction order of diffracted light with the largest quantity of light out of diffracted light for said first laser beam obtained on said diffraction surface; $m_2$ is a diffraction order of diffracted light with the largest quantity of light out of diffracted light for said second laser beam obtained on said diffraction surface; $\lambda_1$ is said first wavelength; $\lambda_2$ is said second wavelength; $n_1(\lambda_1)$ is a refractive index of said first optical part to said first laser beam; $n_1(\lambda_2)$ is a refractive index of said first optical part to said second laser beam; $n_2(\lambda_1)$ is a refractive index of said second optical part to said first laser beam; and $n_2(\lambda_2)$ is a refractive index of said second optical part to said second laser beam.

10. The optical pickup of claim 9, wherein said objective optical system further contains an objective lens for focusing each of said plurality of kinds of laser beams having passed through said diffractive optical element on said information recording surface.

11. The optical pickup of claim 9, wherein said diffractive optical element focuses each of said plurality of kinds of laser beams on said information recording surface.

12. The optical pickup of claim 9, wherein said diffraction surface is formed of a plurality of regularly arranged structural units, each being a concave and/or a convex, said light source emits first through kth laser beams as said plurality of kinds of laser beams, and the following conditional formula (2) is satisfied in a region of said diffractive optical element where at least two or more of said plurality of kinds of laser beams enter:

$$0.83 < (m_i \cdot \lambda_i/|n_1(\lambda_i) - n_2(\lambda_i)|)/h < 1.17 \qquad \text{Formula (2):}$$

wherein $m_i$ is a diffraction order of diffracted light with the largest quantity of light out of diffracted light for an ith laser beam obtained on said diffraction surface; $\lambda_i$ is a wavelength of said ith laser beam; $n_1(\lambda_i)$ is a refractive index of said first optical part to said ith laser beam; $n_2(\lambda_i)$ is a refractive index of said second optical part to said ith laser beam; h is a height of each of said structural units along an optical axis; and i = 1, 2, . . . , k.

13. The optical pickup of claim 9, wherein said diffraction surface is formed of a plurality of regularly arranged structural units, each being a concave and/or a convex, said light source at least emits, as said plurality of kinds of laser beams, a first laser beam of a first wavelength, a second laser beam of a second wavelength different from said first wavelength and a third laser beam of a third wavelength different from said first wavelength and said second wavelength, and the following conditional formulas (3) through (5) are satisfied in a region of said diffractive optical element where at least two of said first through third laser beams enter:

$$0.83 < (m_1 \cdot \lambda_1/|n_1(\lambda_1) - n_2(\lambda_1)|)/h < 1.17 \qquad \text{Formula (3):}$$

$$0.83 < (m_2 \cdot \lambda_2/|n_1(\lambda_2) - n_2(\lambda_2)|)/h < 1.17 \qquad \text{Formula (4):}$$

$$0.83 < (m_3 \cdot \lambda_3/|n_1(\lambda_3) - n_2(\lambda_3)|)/h < 1.17 \qquad \text{Formula (5):}$$

wherein $m_1$ is a diffraction order of diffracted light with the largest quantity of light out of diffracted light for said first laser beam obtained on said diffraction surface; $m_2$ is a diffraction order of diffracted light with the largest quantity of light out of diffracted light for said second laser beam obtained on said diffraction surface; $m_3$ is a diffraction order of diffracted light with the largest quantity of light out of diffracted light for said third laser beam obtained on said diffraction surface; $\lambda_1$ is said first wavelength; $\lambda_2$ is said second wavelength; $\lambda_3$ is said third wavelength; $n_1(\lambda_1)$ is a refractive index of said first optical part to said first laser beam; $n_1(\lambda_1)$ is a refractive index of said first optical part to said second laser beam; $n_1(\lambda_3)$ is a refractive index of said first optical part to said third laser beam; $n_2(\lambda_1)$ is a refractive index of said second optical part to said first laser beam; $n_2(\lambda_2)$ is a refractive index of said second optical part to said second laser beam; $n_2(\lambda_3)$ is a refractive index of said second optical part to said third laser beam; and h is a height of each of said structural units along an optical axis.

* * * * *